United States Patent
Zarshchikov et al.

(10) Patent No.: US 11,620,459 B2
(45) Date of Patent: Apr. 4, 2023

(54) APPARATUS AND METHOD FOR SEARCHING AND REGISTERING TAGS IN LOCAL POSITIONING SYSTEM

(71) Applicant: Samsung Electronics Co., Ltd., Suwon-si (KR)

(72) Inventors: Dmitry Sergeevich Zarshchikov, Moscow (RU); Andrey Vladimirovich Kletsov, Moscow (RU); Alexander Gennadevich Chernokalov, Moscow (RU); Vyacheslav Vasilevich Tyrtov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/535,066

(22) Filed: Nov. 24, 2021

(65) Prior Publication Data

US 2022/0083749 A1    Mar. 17, 2022

Related U.S. Application Data

(63) Continuation of application No. 16/651,756, filed as application No. PCT/KR2018/014917 on Nov. 29, 2018, now Pat. No. 11,216,624.

(51) Int. Cl.
*G06K 7/08* (2006.01)
*G06K 19/06* (2006.01)
(Continued)

(52) U.S. Cl.
CPC ........ *G06K 7/10099* (2013.01); *H04W 4/023* (2013.01); *H04W 4/80* (2018.02)

(58) Field of Classification Search
CPC ........... G06K 7/10099; G06K 7/10039; G06K 19/0723; H04W 4/023; H04W 4/80;
(Continued)

(56) References Cited

U.S. PATENT DOCUMENTS 5,266,925 A   11/1993 Vercellotti et al.
6,144,916 A   11/2000 Wood, Jr. et al.
(Continued)

FOREIGN PATENT DOCUMENTS

JP   2006-086911 A   3/2006
JP   2010-175374 A   8/2010
(Continued)

OTHER PUBLICATIONS

KR101666828B1 System and Method for Searching Location of Objects using RFID technology, English Machine Translation, 5 pages (Year: 2022).*
(Continued)

*Primary Examiner* — Tuyen K Vo
(74) *Attorney, Agent, or Firm* — Jefferson IP Law, LLP

(57) ABSTRACT

The invention relates to local positioning and more particularly to methods of searching and registering tags in a local positioning system. A method of registering tags in a local positioning system is provided. Registering is performed in near-field mode. Tag stores identifying data of the local positioning system. Positioning unit stores identifying data of the tag. Furthermore, a method of searching a tag registered in a local positioning system is provided. Positioning units send address search packets into the space of the local positioning system. Desired tag responds with a positioning pulse. There is also provided a method of searching identifying data of a tag not registered in a local positioning system. Positioning units send broadcast search packets into the space of the local positioning system. Bisection method is used to detect identifying data of the tag. The invention can reduce power consumption by the tag and the positioning unit, and eliminate overlapping the signals received from a plurality of tags.

17 Claims, 13 Drawing Sheets

(51) Int. Cl.
*G06K 7/10* (2006.01)
*H04W 4/80* (2018.01)
*H04W 4/02* (2018.01)

(58) Field of Classification Search
CPC . H04W 4/02; H04W 52/0229; H04W 52/028;
H04W 4/025; H04W 4/38; H04W 74/08;
Y02D 30/70; G01S 13/765; G01S 13/878;
G01S 5/00
USPC .................................................. 235/451, 492
See application file for complete search history.

(56) References Cited

U.S. PATENT DOCUMENTS

| | | | |
|---|---|---|---|
| 6,661,335 | B1 | 12/2003 | Seal |
| 6,717,516 | B2 * | 4/2004 | Bridgelall .......... G08B 13/2462 340/505 |
| 7,155,238 | B2 | 12/2006 | Katz |
| 7,174,172 | B2 | 2/2007 | Sharony et al. |
| 7,200,130 | B2 | 4/2007 | Forstadius et al. |
| 7,373,154 | B2 | 5/2008 | Sharony et al. |
| 7,409,220 | B2 | 8/2008 | Belcea |
| 7,411,921 | B2 | 8/2008 | Strong et al. |
| 7,437,300 | B2 | 10/2008 | Fujimoto |
| 7,463,142 | B2 | 12/2008 | Lindsay |
| 8,115,600 | B2 | 2/2012 | Stevenson et al. |
| 8,305,191 | B2 * | 11/2012 | Dembo ................ G01S 13/878 340/10.1 |
| 8,368,540 | B2 | 2/2013 | Perkins et al. |
| 8,373,562 | B1 | 2/2013 | Heinze et al. |
| 8,395,506 | B2 | 3/2013 | Elledge |
| RE44,408 | E | 8/2013 | Lindsay |
| 8,810,372 | B2 | 8/2014 | Moshfeghi |
| 8,896,422 | B2 | 11/2014 | Koch et al. |
| 8,994,501 | B2 | 3/2015 | O'Haire |
| 9,197,984 | B2 | 11/2015 | Kaufman et al. |
| 9,549,282 | B1 | 1/2017 | Mcdonough et al. |
| 9,609,515 | B2 | 3/2017 | Tredoux et al. |
| 2002/0093956 | A1 | 7/2002 | Gurin |
| 2003/0019929 | A1 | 1/2003 | Stewart et al. |
| 2006/0071757 | A1 | 4/2006 | Burghard et al. |
| 2006/0158310 | A1 | 7/2006 | Klatsmanyi et al. |
| 2007/0103303 | A1 | 5/2007 | Shoarinejad |
| 2009/0224884 | A1 * | 9/2009 | Tuttle ................... G06K 7/0008 340/10.1 |
| 2009/0231138 | A1 | 9/2009 | Lai et al. |
| 2009/0315685 | A1 | 12/2009 | Bauchot et al. |
| 2010/0109847 | A1 | 5/2010 | Noel et al. |
| 2010/0109849 | A1 | 5/2010 | Wang et al. |
| 2010/0253481 | A1 * | 10/2010 | Zand ......................... G01S 5/14 340/10.3 |
| 2012/0246074 | A1 | 9/2012 | Annamalai et al. |
| 2013/0110393 | A1 | 5/2013 | Heed et al. |
| 2014/0084060 | A1 | 3/2014 | Jain et al. |
| 2016/0055566 | A1 | 2/2016 | Otani et al. |
| 2017/0131383 | A1 | 5/2017 | Bartov et al. |
| 2017/0308692 | A1 | 10/2017 | Yano |
| 2017/0317702 | A1 | 11/2017 | O'Hagan et al. |
| 2019/0130144 | A1 * | 5/2019 | Huang ............... G06K 7/10356 |

FOREIGN PATENT DOCUMENTS

| | | | |
|---|---|---|---|
| KR | 101104815 B1 * | 1/2012 | .............. G01S 11/06 |
| KR | 10-1666828 B1 | 10/2016 | |
| RU | 2607417 C2 | 1/2017 | |
| WO | 2010/133753 A1 | 11/2010 | |
| WO | 2016/063878 A1 | 4/2016 | |

OTHER PUBLICATIONS

KR101666828B1 The Method and System for Goods Position Information Express to Utilize Name Tag, English Machine Translation, 6 pages (Year: 2022).*
Russian Office Action dated Aug. 15, 2018, issued in Russian Patent Application No. 2017141818.
Russian Decision to Grant dated Jan. 9, 2019, issued in Russian Patent Application No. 2017141818.
Extended European Search Report dated Jul. 15, 2020, issued in European Patent Application No. 18883663.9.
Zibro Naver Blog, Exterior Zibro for Companion Animal Registration—Bluetooth recognition app and app for tracking missing cats and dogs https://blog.naver.com/seenan/30187322966, Aug. 20, 2014.

* cited by examiner

[Fig. 1]
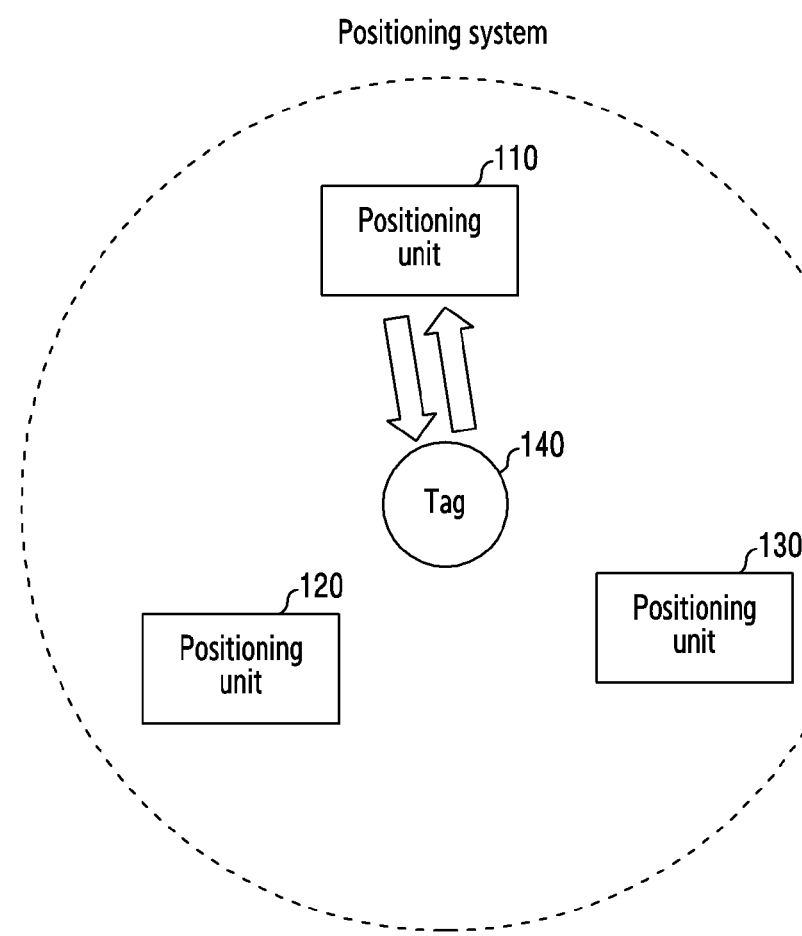

[Fig. 2]
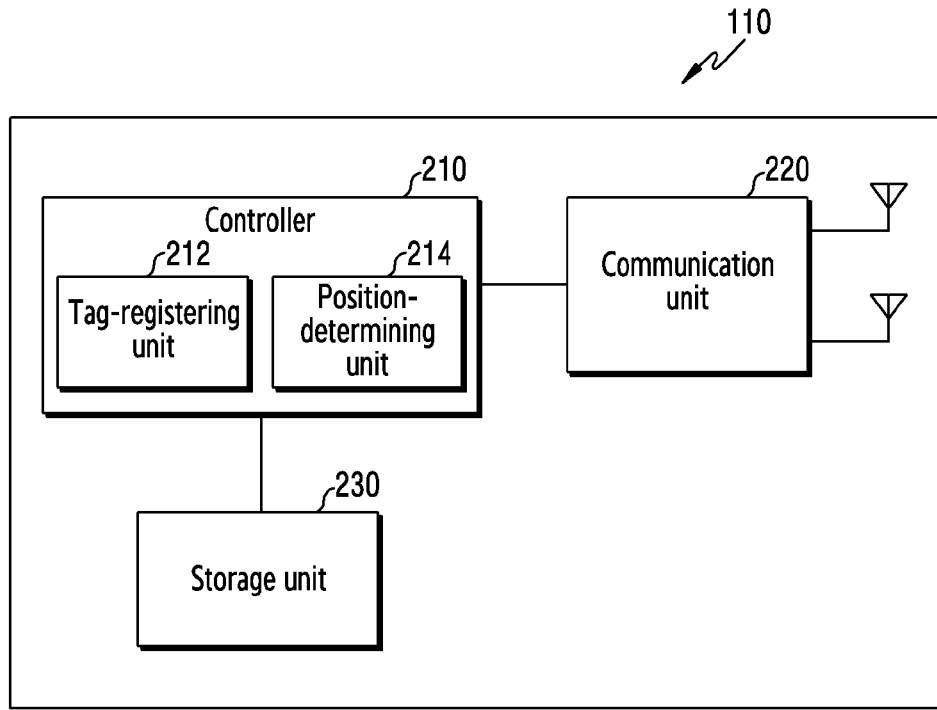
[Fig. 3]
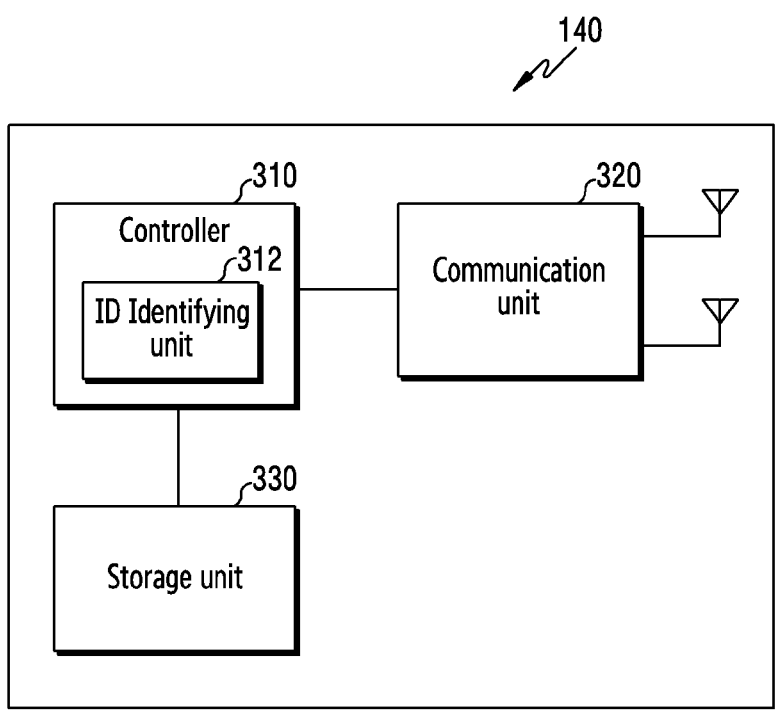

[Fig. 4]
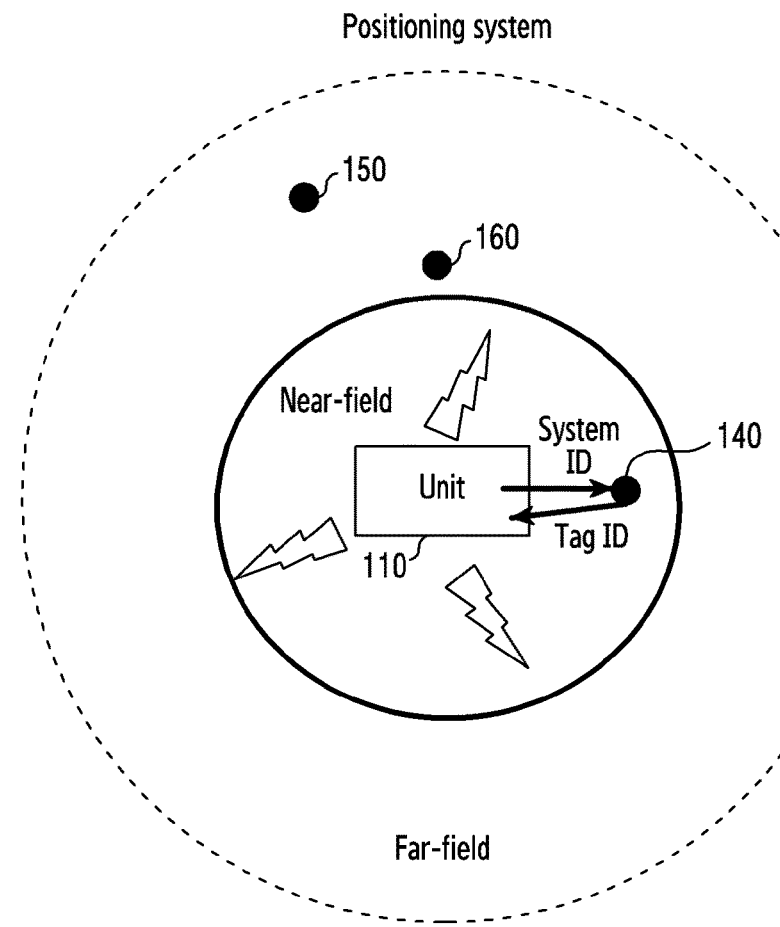
[Fig. 5]
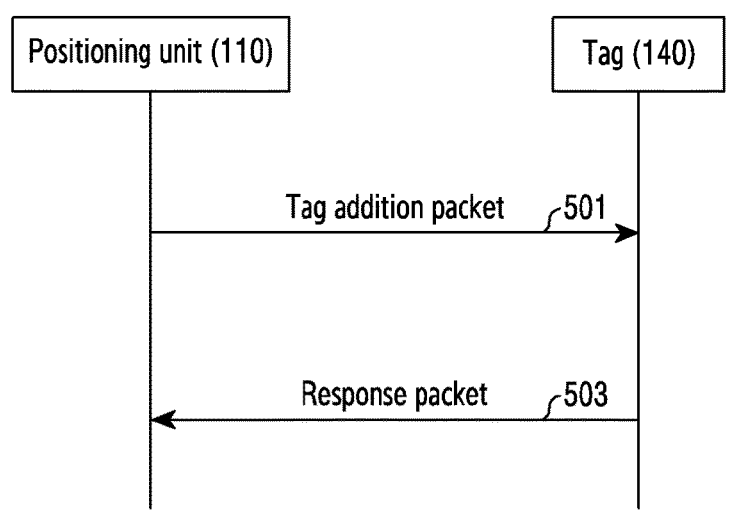

[Fig. 6]
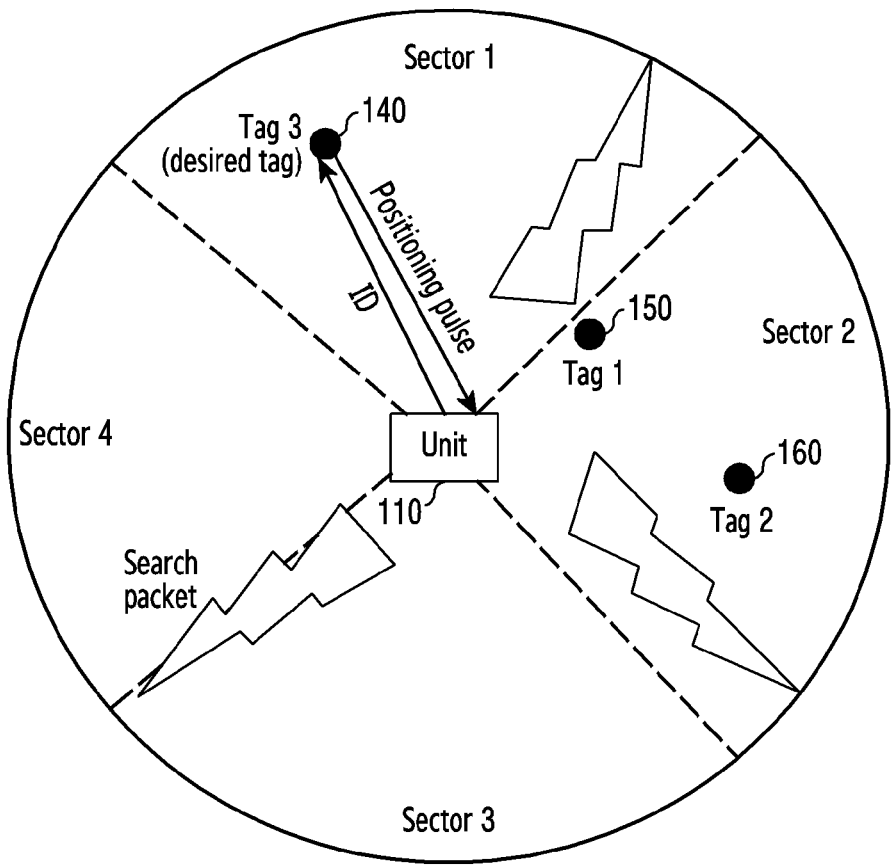
[Fig. 7]
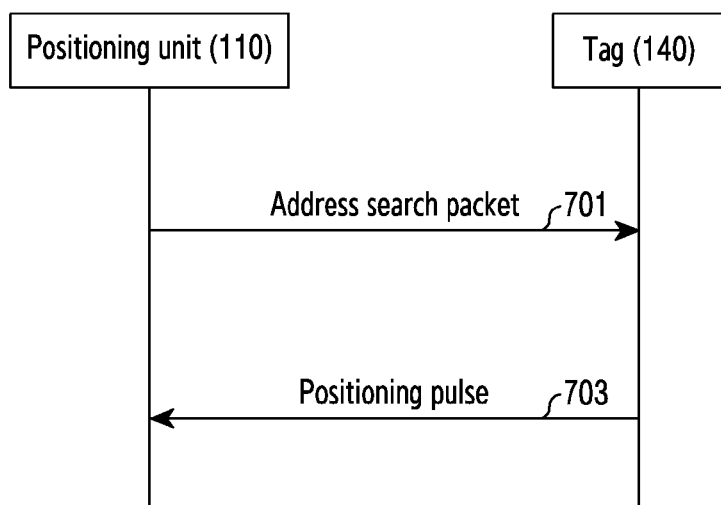

[Fig. 8]
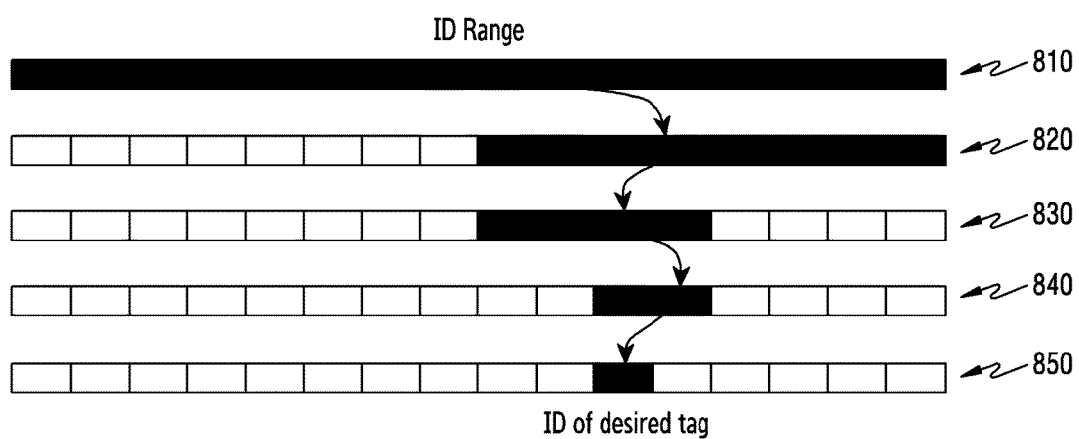

[Fig. 9]
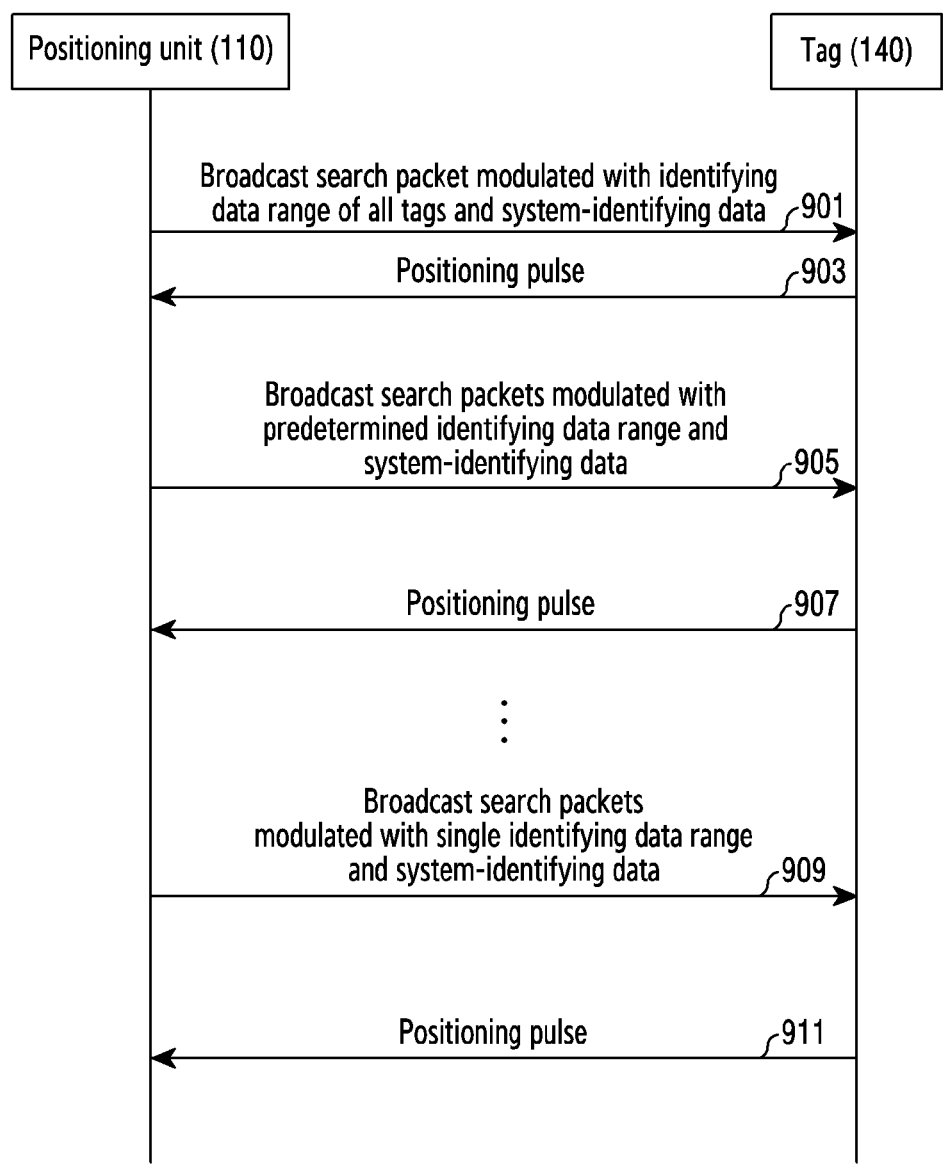

[Fig. 10]
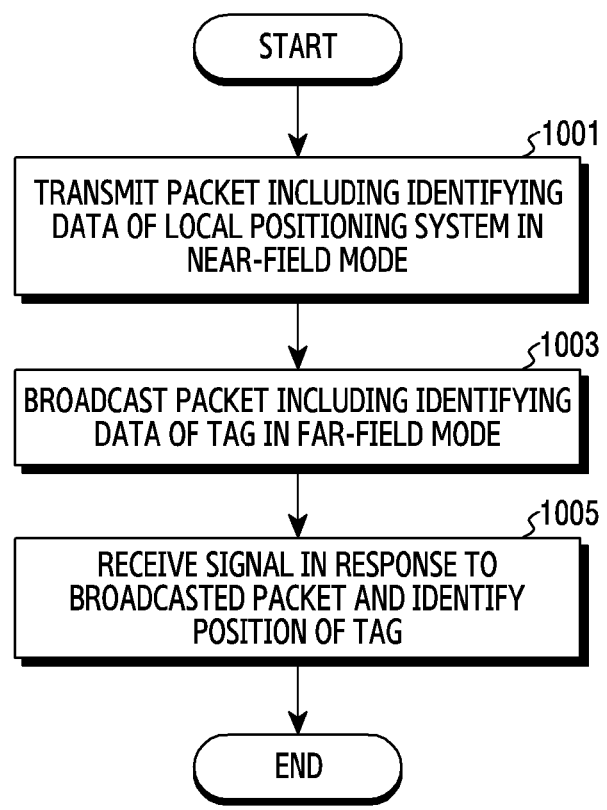

[Fig. 11]
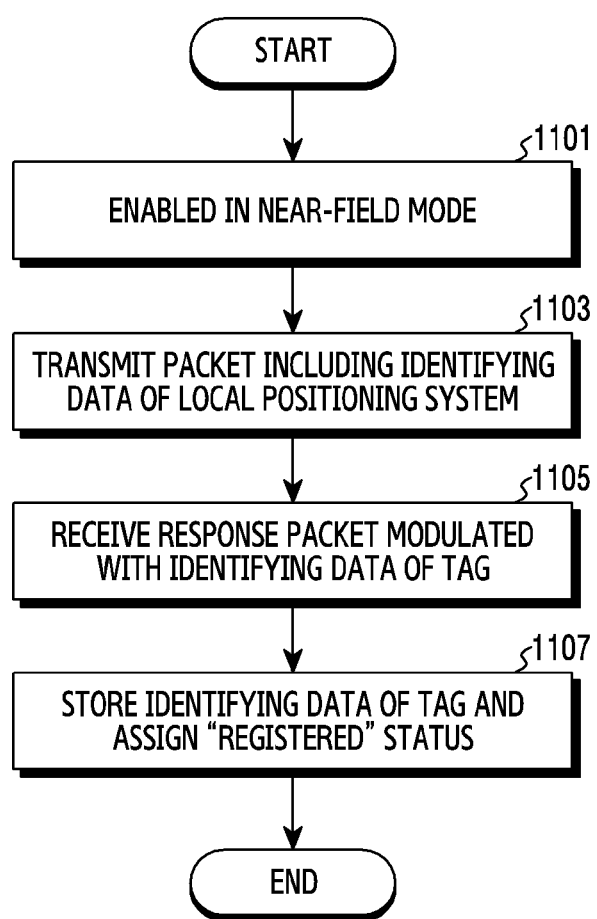

[Fig. 12]
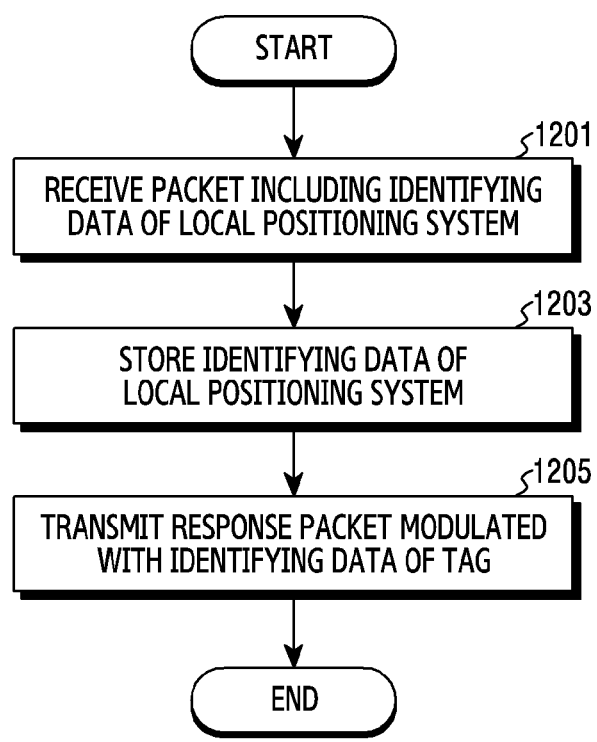

[Fig. 13]
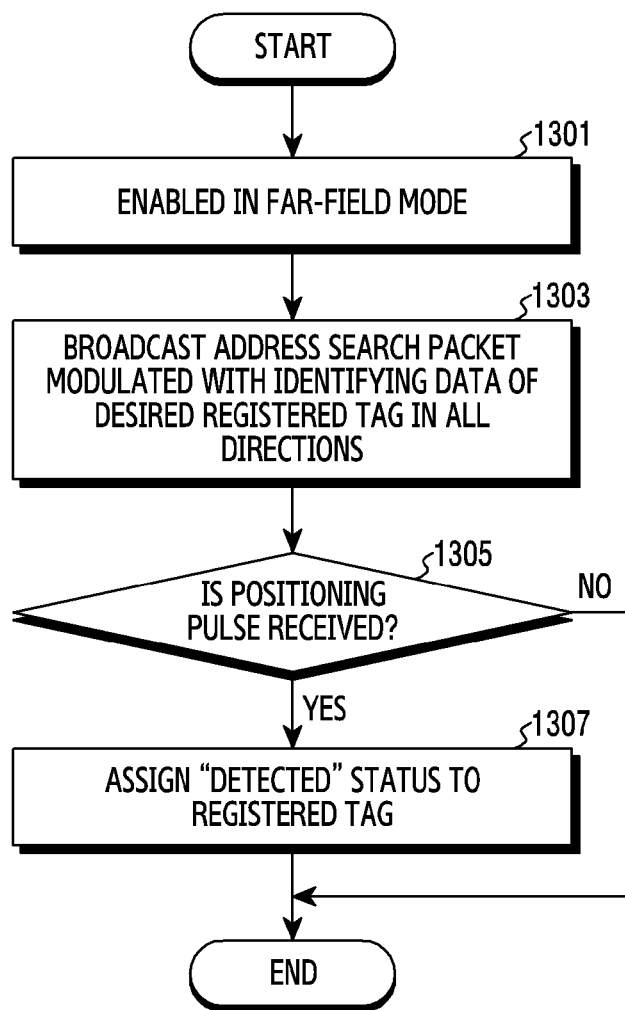

[Fig. 14]
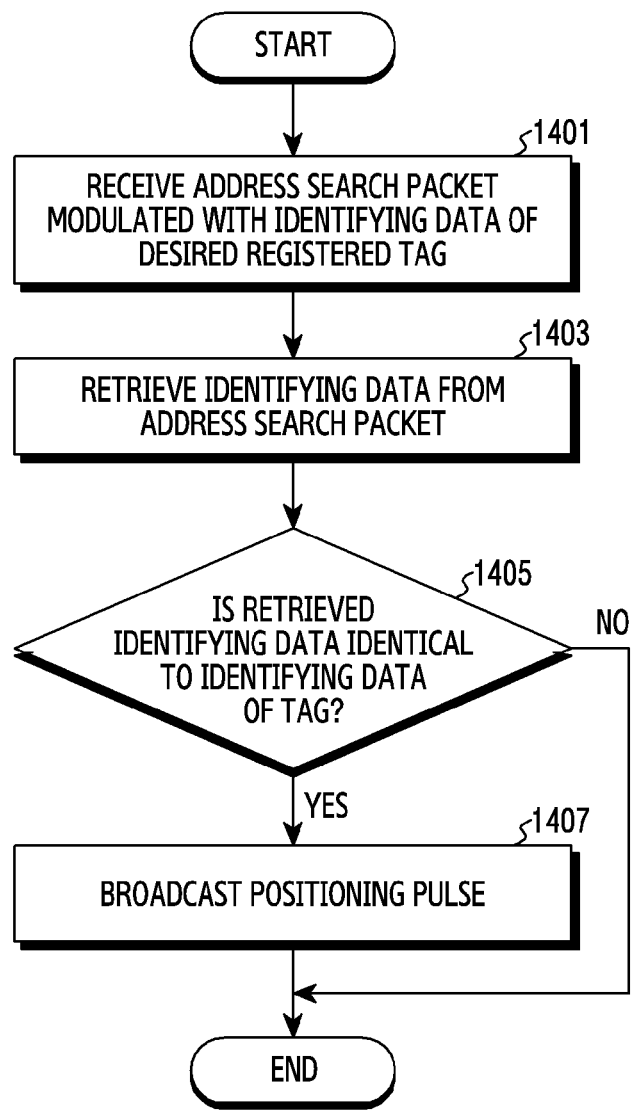

[Fig. 15]
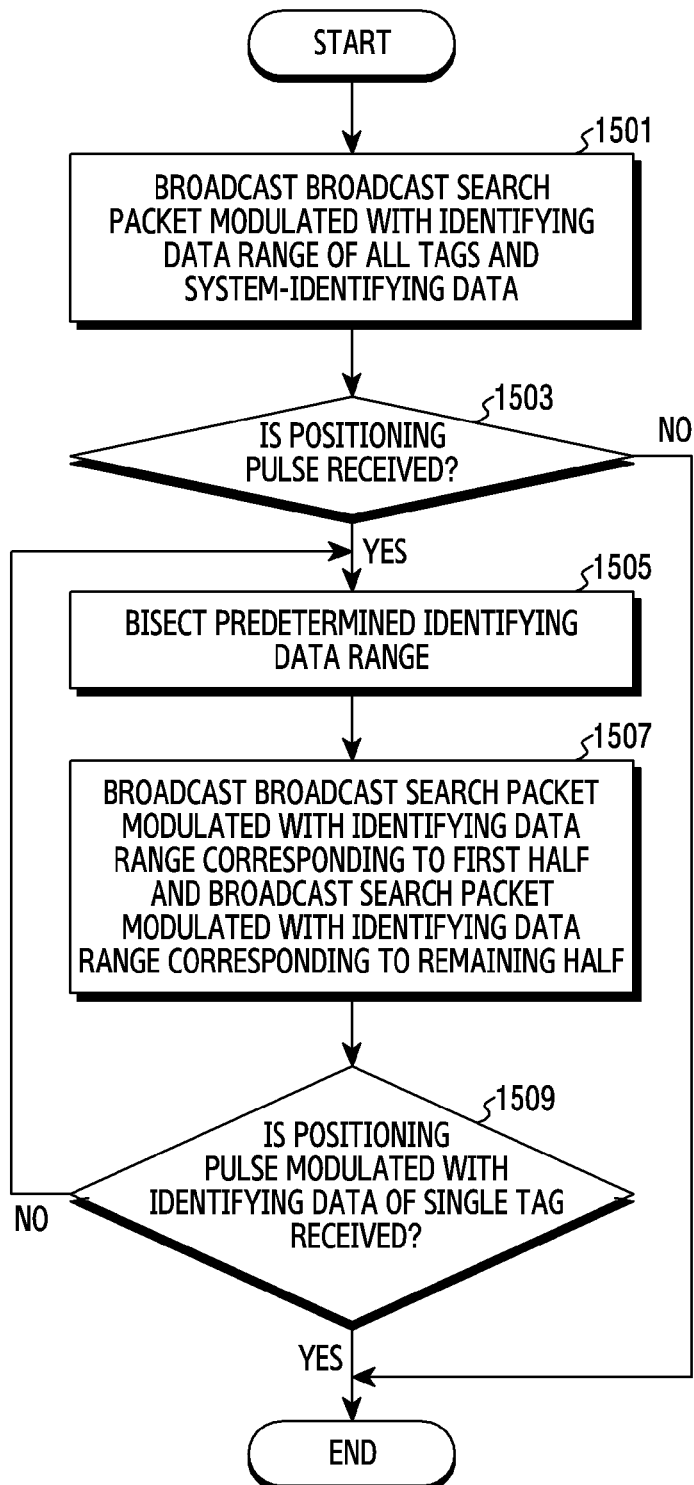

[Fig. 16]
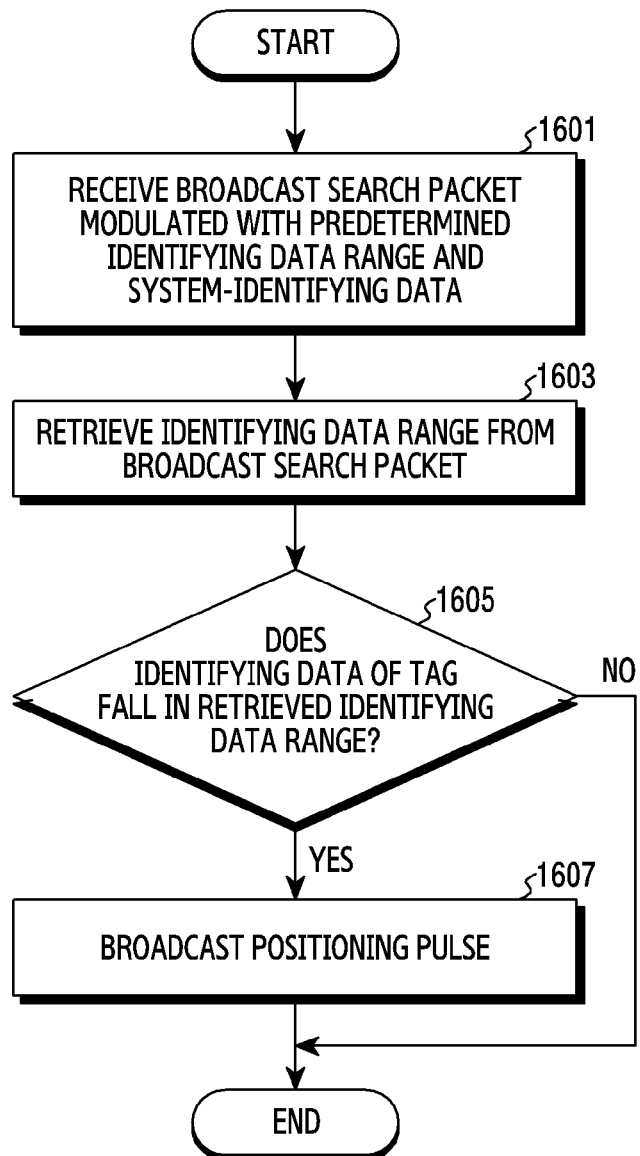

APPARATUS AND METHOD FOR SEARCHING AND REGISTERING TAGS IN LOCAL POSITIONING SYSTEM

CROSS-REFERENCE TO RELATED APPLICATION(S)

This application is a continuation application of prior application Ser. No. 16/651,756, filed on Mar. 27, 2020, which a U.S. National Stage application under 35 U.S.C. § 371 of an International application number PCT/KR2018/014917, filed on Nov. 29, 2018, and was based on and claimed priority under 35 U.S.C § 119(a) of a Russian patent application number 2017141818, filed on Nov. 30, 2017, in the Russian Federation Patent Office, and of a Korean patent application number 10-2018-0115196, filed on Sep. 27, 2018, in the Korean Intellectual Property Office, the disclosure of which is incorporated by reference herein in its entirety.

TECHNICAL FIELD

The present disclosure relates to local positioning, and more particularly, to a method of searching for a tag and registering the same in a local positioning system (LPS).

BACKGROUND ART

Along with the conventional satellite global positioning systems, there is also a need for local positioning systems used to exactly locate various objects/subjects, both indoors and outdoors.

Currently there is a variety of local positioning systems, of which the most widespread are systems using passive radio frequency identification (RFID) tags and systems using active tags with ultra-broadband microwave signals.

For example, US 20100109847, published on 6 May 2010, discloses an RFID tag interrogation system, in which various control frames are used for communication with known and new tags in a predetermined area. The disadvantage of the prior art system is that signals from several simultaneously responded tags are overlapping, and the system is not able to detect a single desired tag if a large number of tags responds.

Furthermore, U.S. Pat. No. 5,266,925, published on 30.11. 1993, discloses an electronic identification tag interrogation method. There are many tags, each having its identifying data; tags are searched by a bisection method, in which the system interrogates a group of tags while specifying the range of identifying data. The system is protected from overlapping the response signals from tags. However, the prior art method of detecting a tag with desired identifying data is very slow.

In conventional tag identification systems using simple protocols (for example, RFID), the system generally sends "interrogate tag" command without specifying specific identifying data (ID) of the tag. Therefore, all the tags that have received the "interrogate tag" command try to simultaneously respond to the command and report their identifying data. This leads to overlapping the signals and complicates data recognition. However, this problem has been already solved in address search (by known ID) and does not interfere with exact locating.

Conventional communication protocols, which could be used in the tag search, such as Bluetooth, Wi-Fi, technology using ultra-wideband (UWB) signals such as Pixie, have the following drawbacks:

high power consumption of the tag per se;

the need to use a powerful processor; a reasonably powerful processor is required to a tag for encoding and decoding complex signals, for signal separation; the need for a powerful processor for tags implies a noticeable increase in the cost and power consumption, increased dimensions, and addition of batteries;

the need for periodic retransmission of signals, since conventional protocols involve operation of a tag from a battery, and the need for a sleep mode with periodic "wake-ups". To save power the tag is in sleep mode most of the time and is enabled at specified intervals for a short time by an internal timer. During the sleep mode the tag does not receive signals and cannot be interrogated, during the activity period the tag should send a signal (packet) to communicate with other devices in the system even if it is not necessary at the moment (no request is received from other devices in the system). That is, regardless of whether new information about this tag is required at the moment, the tag should send information at a specified frequency thereby losing battery power.

DISCLOSURE OF INVENTION

Technical Problem

Embodiments of the present disclosure provide methods and apparatuses for registering new tags in a local positioning system, determining identifying data and detecting unregistered tags in the system without interfering with the process of searching the tags already registered in the system.

Solution to Problem

In accordance with an aspect of the present disclosure, there is provided an apparatus for searching for and registering at least one tag in a system, the apparatus including: a memory; a transceiver; and at least one processor configured to be couplable with the memory and the transceiver. The at least one processor is configured to perform: receiving, from at least one tag in a near-field mode, a packet including identifying data of the at least one tag; broadcasting a packet including identifying data of a tag, of which the identifying data is stored in the apparatus as being in a "registered" status, in a far-field mode; and receiving a first response signal in response to the broadcasted packet and identifying the position of the tag having the identifying data which is stored in the apparatus as being in the "registered" status.

In accordance with another aspect of the present disclosure, there is provided a tag for registering and searching for at least one tag in a system, the tag including: a memory; a transceiver; and at least one processor configured to be couplable with the memory and the transceiver. The at least one processor may transmit a packet including identifying data of the tag to an apparatus, may receive, from the apparatus, a packet including identifying data which is stored in the apparatus as being in a "registered" status, and may transmit a first response signal to the apparatus after receiving the packet including the identifying data which is stored in the apparatus as being in the "registered" status.

In accordance with another aspect of the present disclosure, there is provided an operation method of an apparatus, the method including: receiving, from at least one tag in a near-field mode, a packet including identifying data of the at least one tag; broadcasting a packet including identifying data of a tag, of which the identifying data is stored in the apparatus as being in a "registered" status; and receiving a first response signal as a response to the broadcast packet and identifying the position of the tag having the identifying data which is stored in the apparatus as being in the "registered" status.

In accordance with another aspect of the present disclosure, there is provided an operation method of a tag, the method including: transmitting a packet including identifying data of the tag to an apparatus; receiving, from the apparatus, a packet including identifying data which is stored in the apparatus as being in a "registered" status; and transmitting a first response signal to the apparatus after receiving the packet including the identifying data which is stored in the apparatus as being in the "registered" status.

Advantageous Effects of Invention

Compared to the background art, the present invention can reduce power consumption in a tag and a positioning unit, and simplify the problem solved by the processor of the positioning unit, i.e. reduce the requirements imposed on the processor, and the present invention can also eliminate overlapping the signals received from a plurality of tags.

BRIEF DESCRIPTION OF DRAWINGS

FIG. 1 is a diagram illustrating an example of a local positioning system (LPS) including a positioning unit and a tag according to various embodiments of the present disclosure;

FIG. 2 is a block diagram illustrating a positioning unit according to various embodiments of the present disclosure;

FIG. 3 is a block diagram illustrating a tag according to various embodiments of the present disclosure;

FIG. 4 is a diagram illustrating an example of registering a new tag in a local positioning system according to various embodiments of the present disclosure;

FIG. 5 is a diagram illustrating signal exchange performed for registering a new tag in a local positioning system according to various embodiments of the present disclosure;

FIG. 6 is a diagram illustrating an example of searching for a tag in a local positioning system according to various embodiments of the present disclosure;

FIG. 7 is a diagram illustrating signal exchange performed for searching for a desired registered tag in a local positioning system according to various embodiments of the present disclosure;

FIG. 8 is a diagram illustrating an example of a change made in an identifying data (ID) range for searching for a tag that is not registered in a local positioning system according to various embodiments of the present disclosure;

FIG. 9 is a diagram illustrating signal exchange performed for searching for an unregistered tag in a local positioning system according to various embodiments of the present disclosure;

FIG. 10 is a flowchart illustrating a method of identifying the position of a tag by a positioning unit according to various embodiments of the present disclosure;

FIG. 11 is a flowchart illustrating the operation of a positioning unit when tag registration in a local positioning system is performed according to various embodiments of the present disclosure;

FIG. 12 is a flowchart illustrating the operation of a tag when tag registration in a local positioning system is performed according to various embodiments of the present disclosure;

FIG. 13 is a flowchart illustrating the operation of a positioning unit when a search for a tag registered in a local positioning system is performed according to various embodiments of the present disclosure;

FIG. 14 is a flowchart illustrating the operation of a tag when a search for a tag registered in a local positioning system is performed according to various embodiments of the present disclosure;

FIG. 15 is a flowchart illustrating the operation of a positioning unit when a search for a tag not registered in a local positioning system is performed according to various embodiments of the present disclosure; and FIG. 16 is a flowchart illustrating the operation of a tag when a search for a tag not registered in a local positioning system is performed according to various embodiments of the present disclosure.

BEST MODE FOR CARRYING OUT THE INVENTION

The terms used in the present disclosure are only used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure provided hereinafter relates to a method and an apparatus for registering and searching for a tag in a local positioning system (LPS). Particularly, the present disclosure describes technology for registering a tag in a local positioning system and retrieving the position of the tag via a process of transmitting and receiving system-identifying data and tag-identifying data between a positioning unit and a tag in the local positioning system.

In the descriptions, terms indicating the operation state of a device (e.g., "mode"), terms indicating a signal (e.g., "packet" or "pulse"), terms indicating a channel, terms indicating control information, terms indicating network entities (e.g., "positioning unit" or "tag"), terms indicating elements of a device, and the like are used for ease of description. Accordingly, the present disclosure is not limited to the following terms, and other terms having the same technical meaning may be used.

FIG. 1 is a diagram illustrating an example of a local positioning system (LPS) including a positioning unit and a tag 140 according to various embodiments of the present disclosure.

Referring to FIG. 1, the local positioning system may include positioning units 110, 120, and 130 and at least one tag 140. The positioning units 110, 120, and 130 are entities that register and search for the tag 140, and the tag 140 is an object, the position of which is to be retrieved by the positioning units 110, 120, and 130.

The positioning unit 110 may register the tag 140 in the local positioning system and may retrieve the position of the tag 140 by performing, with the tag 140, transmission and reception of system-identifying data and the identifying data of the tag 140. For example, the positioning unit 110 in the local positioning system may calculate the coordinates of a point where the tag 140 propagates a positioning pulse, and may retrieve the position of the tag 140. For example, when at least three positioning units 110, 120, and 130 are used, the position of the tag may be retrieved using triangulation.

According to various embodiments, the local positioning system may include many positioning units 110, 120, and 130 which are disposed at known points in an area where a tag needs to exist. At least three units of positioning measure may be needed in order to accurately determine the position of the tag 140, and a larger number of positioning units may be disposed for use in a larger area. Each of the positioning units 110, 120, and 130 may transmit a packet to the tag 140, and may receive a pulse from the tag 140. The position of a tag may be calculated using a time difference of arrival (TDoA) or an angle of arrival (AoA) of the tag.

According to various embodiments, in the case in which the tag 140 is registered in the local positioning system, the positioning unit 110 may search for a tag. A process of searching for a registered tag may be a process of finding the position of the tag. When the identifying data of a tag desired to be retrieved is known, the positioning unit 110 may search for a registered tag. For example, when a "registered" status was previously assigned to a tag in the system, the positioning unit 110 may search for a registered tag. In this instance, when an address search packet is transmitted together with the identifying data of a desired tag and the corresponding tag receives the same, the corresponding tag may transmit a positioning pulse in response thereto. The positioning pulse may be used for calculating the position of the tag. The process of searching for a registered tag may be the same as the process of finding the position of the tag.

According to various embodiments, in the case in which the tag 140 is not registered in the local positioning system, the positioning unit 110 may search for a tag. A process of searching for an unregistered tag may be a process of finding the position of the tag. Even when the identifying data of a tag desired to be retrieved is not known, the positioning unit 110 may search for a tag. For example, unlike the case of a registered tag, when some unregistered tags are missing in a local positioning system area, a packet that is modulated with the identifying data of a tag may not be broadcasted. Therefore, the positioning unit 110 may perform a search in order to identify the identifying data of a tag, and may register the tag, and may search for the registered tag based on the identified identifying data, so as to find the position of the tag.

According to various embodiments, the tag 140 may determine whether the identifying data modulated in a packet transmitted by the positioning unit 110 is identical to its own identifying data. For example, when the tag 140 is registered in the local positioning system, the positioning unit 110 may broadcast an address search packet modulated with the identifying data of a desired tag in order to search for a registered tag and to determine the position of the tag. The tag that receives the address search packet may determine whether the identifying data modulated in the packet is identical to its own identifying data, and may transmit a response in the form of a positioning pulse when they are identical. For example, when the tag 140 is not registered in the local positioning system, the positioning unit 110 may broadcast a broadcast search packet modulated with the identifying data range of tags in order to search for an unregistered tag. The tag that receives the broadcast search packet may determine whether the identifying data that is the identical to its own identifying data is included in the identifying data range modulated in the packet, and may transmit a response in the form of a positioning pulse when the identical identifying data is included in the identifying data range.

FIG. 2 is a block diagram illustrating a positioning unit according to various embodiments of the present disclosure. The configuration of FIG. 2 may be construed as a part of the configuration of the positioning unit 110. The term "unit" or the suffix "er" used hereinafter may refer to a unit for processing at least one function or operation, and may be implemented in hardware, software, or a combination of hardware and software.

Referring to FIG. 2, the positioning unit may include a controller 210, a communication unit 220, and a storage unit 230.

The communication unit 220 may perform functions for transmitting and receiving signals via a wireless channel. For example, the communication unit 220 performs conversion between a baseband signal and a bit stream according to a physical layer standard of the system. For example, when data is transmitted, the communication unit 220 generates complex symbols by encoding and modulating a transmission bit stream. Also, when data is received, the communication unit 220 restores a reception bit stream by demodulating and decoding a baseband signal. Also, the communication unit 220 up-converts a baseband signal into a radio-frequency (RF) band signal and transmits the same via an antenna, and down-converts an RF band signal received via an antenna into a baseband signal. For example, the communication unit 220 may include a transmission filter, a reception filter, an amplifier, a mixer, an oscillator, a digital to analog convertor (DAC), an analog to digital convertor (ADC), and the like. The communication unit 220 may include a digital circuit and an analog circuit (e.g., a radio-frequency integrated circuit (RFIC)) from the perspective of hardware. Here, the digital circuit and the analog circuit may be implemented as one package.

In addition, the communication unit 220 may include a plurality of communication modules for supporting a plurality of different radio access technologies. For example, the different radio access technologies may include Bluetooth Low Energy (BLE), Wireless Fidelity (Wi-Fi), Wi-Fi Gigabyte (WiGig), a cellular network (e.g., Long Term Evolution (LTE)), and the like. Further, the different frequency bands may include a super high frequency (SHF) band (e.g., 2.5 GHz and 5 GHz) and a millimeter (mm) wave band (e.g., 60 GHz).

The communication unit 220 may transmit and receive a signal as described above. Accordingly, the entirety or a part of the communication unit 220 may be referred to as a "transmitting unit", a "receiving unit", or a "transceiving unit". Also, the transmission and reception performed via a wireless channel, which is described in the following descriptions, may be understood to include that the above-described processing is performed by the communication unit 220.

The storage unit 230 may store data, such as a basic program, an application program, configuration information, and the like for operating the positioning unit. The storage unit 230 may be configured as volatile memory, nonvolatile memory, or a combination of volatile memory and nonvolatile memory. In addition, the storage unit 230 may provide data stored therein in response to a request from the controller 210.

The controller 210 may control the general operation of the positioning unit. For example, the controller 210 may transmit and receive a signal via the communication unit 220. Further, the control unit 210 records data in the storage unit 230 and reads recorded data. The controller 210 may perform the functions of a protocol stack required by the communication standard. To this end, the controller 210 may include at least one processor or a micro-processor, or may be a part of the processor. According to various embodiments, the controller 210 may include the storage unit 230, and may include an interface (I/F).

According to various embodiments, the controller 210 may transmit a packet including the identifying data of a local positioning system in a near-field mode, may broadcast a packet including the identifying data of a tag in a far-field mode, and may receive a signal transmitted in response to the broadcasted packet so as to identify the position of the tag. According to various embodiments, the controller 210 may register a tag in the local positioning system and may search for the registered tag, and may search for a tag that is not registered in the local positioning system, may register the tag, and may identify the position thereof. To this end, the controller 210 may include a tag-registering unit 212 for registering a tag and a position-determining unit 214 for determining the position of a tag using a time difference of arrival or an angle of arrival of the tag based on a pulse received from the tag. Here, the tag-registering unit 212 and the position-determining unit 214, which are an instruction set or code stored in the storage unit 230, may be instructions/code at least temporarily residing in the controller 210, a storage space for storing instructions/code, or a part of circuitry included in the controller 210. For example, the controller 210 may perform control such that the positioning unit performs operations according to various embodiments to be described below.

FIG. 3 is a block diagram illustrating a tag according to various embodiments of the present disclosure. The configuration of FIG. 3 may be construed as part of the configuration of the positioning unit 110. The term "unit" or the suffix "~er" used hereinafter may refer to a unit for processing at least one function or operation, and may be implemented in hardware, software, or a combination of hardware and software.

Referring to FIG. 3, the positioning unit may include a controller 310, a communication unit 320, and a storage unit 330.

The communication unit 320 may perform functions for transmitting and receiving signals via a wireless channel. For example, the communication unit 320 may perform conversion between a baseband signal and a bit stream according to a physical layer standard of the system. For example, when data is transmitted, the communication unit 320 generates complex symbols by encoding and modulating a transmission bit stream. Also, when data is received, the communication unit 320 restores a reception bit stream by demodulating and decoding a baseband signal. Also, the communication unit 320 up-converts a baseband signal into an RF band signal and transmits the same via an antenna, and down-converts an RF band signal received via an antenna into a baseband signal. For example, the communication unit 320 may include a transmission filter, a reception filter, an amplifier, a mixer, an oscillator, a DAC, an ADC, and the like. The communication unit 320 may include a digital circuit and an analog circuit (e.g., an RFIC) from the perspective of hardware. Here, the digital circuit and the analog circuit may be implemented as one package.

In addition, the communication unit 320 may include a plurality of communication modules for supporting a plurality of different radio access technologies. For example, the different radio access technologies may include BLE, WiGig, a cellular network (e.g., LTE), and the like. Further, the different frequency bands may include an SHF band (e.g., 2.5 GHz or 5 GHz) and an mm wave band (e.g., 60 GHz).

The communication unit 320 may transmit and receive a signal as described above. Accordingly, the entirety or a part of the communication unit 320 may be referred to as a "transmitting unit", a "receiving unit", or a "transceiving unit". Also, the transmission and reception performed via a wireless channel, which is described in the following descriptions, may be understood to include that the above-described processing is performed by the communication unit 320.

The storage unit 330 may store data, such as a basic program for operating a tag, an application program, configuration information, and the like. The storage unit 330 may be configured as volatile memory, nonvolatile memory, or a combination of volatile memory and nonvolatile memory. In addition, the storage unit 330 may provide data stored therein in response to a request from the controller 310.

The controller 310 may control the general operation of the tag. For example, the controller 310 may transmit and receive a signal via the communication unit 320. Further, the controller 310 records data in the storage unit 330 and reads the recorded data. The controller 310 may perform the functions of a protocol stack required by the communication standard. To this end, the controller 310 may include at least one processor or a micro-processor, or may be a part of the processor. According to various embodiments, the controller 310 may include the storage unit 330.

According to various embodiments, the controller 310 may receive a packet including the identifying data of the local positioning system in a near-field mode, may receive a packet including the identifying data of a tag in a far-field mode, and may transmit a signal in response to a broadcasted packet so as to respond to the positioning unit. To this end, the controller 310 may include an ID identifying unit 312 for identifying whether modulated identifying data is identical to the identifying data of the tag in order to transmit a response to a packet received from the positioning unit. Here, the ID identifying unit 312, which is an instruction set or code stored in the storage unit 330, may be instructions/code at least temporarily residing in the controller 310, storage space for storing instructions/code, or a part of circuitry included in the controller 310. For example, the controller 310 may perform control such that the tag performs operations according to various embodiments to be described below.

According to various embodiments, the tag may be a normal RFID tag.

FIG. 4 is a diagram illustrating an example of registering a new tag in a local positioning system according to various embodiments of the present disclosure. For example, when registering a new tag, a positioning unit may operate in a near-field mode.

Referring to FIG. 4, in a process of registering a new tag in the local positioning system, the positioning unit 110 enters the near-field mode. In the near-field mode, the power of the positioning unit 110 may be decreased in order to reduce the distance to which a packet of the positioning unit 110 can propagate. In order to register the tag 140 in the local positioning system, a user may enable a master positioning unit or a random slave positioning unit in the near-field mode using, for example, a smart phone. According to various embodiments, a unit randomly selected by the user may operate in the near-field mode.

In near-field mode, power of the positioning unit 110 is reduced to reduce the distance at which packets of the positioning unit 110 can propagate, i.e. only the tags (e.g. tag 140) located in the immediate vicinity of the positioning unit can respond to "add tag to system" packets sent from the positioning unit in this mode, therefore the other tags (e.g. tag 150 and tag 160) will not respond to the "add tag to system" packets sent by the positioning unit 110 to the tag being registered.

As shown in FIG. 4, the user places a tag 140 in near field; when the positioning unit 110 is operating in near-field mode, the positioning unit 110 sends "add tag to the system" packet. Having received this packet, the tag 140 being registered stores the identifying data of the local positioning system in internal memory of its microcontroller. The tag 140 responds by sending a response packet modulated with its identifying data to the unit 110. The unit 110 stores the tag identifying data and sends "registered" status for this tag 140 to the user smartphone.

It should be noted that being registered in near field, the tag 140 can respond with a full packet comprising the tag ID, as opposed to work in far field, where the tag can send only a positioning pulse.

The tag registering can also occur without enabling near-field mode for the positioning unit, however, in near-field mode the tag registering proceeds faster, since only tags located in the immediate vicinity of the positioning unit respond to the "add tag to system" packet. Preparing and sending a data packet instead of a short pulse requires much more power, so it can be done only if there is a reliable power source for the tag—either a battery, or a closely disposed charging device. In near-field operation it is assumed that the tag is immobile and close to the positioning unit and the power source in it, so it gets enough energy for continuous operation for a relatively long period sufficient to prepare and send the full packet modulated with data. In addition, when registering, the user must bring only one tag to the positioning unit, therefore, no problems should arise with overlapping the signals from several tags. Thus, to successfully registering tag in a local positioning system, a set of the following factors is required:

close proximity of the tag to the positioning unit for reliable continuous powering of the tag;

presence of only one tag in near field coverage to eliminate overlapping the signals from several tags.

Procedure of removing a tag from a local positioning system is performed only in near field.

The user places a tag in near field; after being enabled in near-field mode the positioning unit sends "remove tag from the system" packet. Having received the "remove tag from the system" packet, the registered tag removes identifying data of the local positioning system from internal memory of the microcontroller. In response, the tag sends to the system unit a response packet about successful removal from the local positioning system. The unit checks the packet received from the tag and sends "removed" status for this tag to the user smartphone.

According to various embodiments, a packet modulated with identifying data, for example, an address search packet or a broadcast search packet, may store a predetermined data range or data. According to various embodiments, a packet modulated with the identifying data of the system may store the identifier of the system. For example, when the identification number of the system is 1067 and a packet is modulated with the identifying data range of the system, the packet may store the identifier "1067". According to various embodiments, a packet modulated with identifying data of all existing tags may store minimum and maximum probable identifiers. For example, when a packet is modulated with an identifying data range of "1" to "1000000", the packet may store identifiers "1" and "1000000". For example, in a system having an identifier "1067", when the identifying data range of all tags is from "1" to "1000000", a predetermined packet that is modulated with the identifying data of the system and the identifying data range of all tags may be a packet storing (1067, 1, 1000000).

FIG. 5 is a flowchart illustrating a method of registering a new tag in a local positioning system according to various embodiments of the present disclosure. FIG. 5 illustrates signal exchange performed between the positioning unit 110 and the tag 140.

Referring to FIG. 5, in operation 501, the positioning unit 110 may transmit a tag addition packet. Here, the tag addition packet is a message for assigning a "registered" status to the tag 140, and may include an "add tag to the system" packet, which has been described with reference to FIG. 4. In this instance, the tag 140 may be in the state in which the tag 140 is not assigned with a "registered" status in the local positioning system. For example, the identifying data of the tag 140 may be in the state in which the identifying data of the tag 140 is not stored in the system as being in the "registered" status. For example, the tag addition packet may include the identifying data of the local positioning system. The tag 140 that receives the tag addition packet may store the identifying data of the local positioning system.

In operation 503, the positioning unit 110 may receive a response packet. Here, the response packet may be a response message from the tag 140 that receives the tag addition packet of the positioning unit 110, and may include a response packet modulated with the identifying data of the tag 140, which has been described with reference to FIG. 4. In this instance, the positioning unit 110 may receive the response packet and may store the identifying data of the tag 140. For example, the positioning unit 110 may assign a "registered" status to the tag 140. According to various embodiments, the positioning unit 110 may transmit data associated with the "registered" status to a user smart phone for the tag 140.

According to various embodiments, in the process of registering the tag 140 in the local positioning system, the positioning unit 110 may be enabled in the near-field mode, in which the power of the positioning unit 110 is reduced in order to decrease the distance to which a search packet can propagate. The tag 140 may be disposed at a distance from the positioning unit 110 that does not exceed the distance to which a packet of the positioning unit 110 can propagate in the near-field mode.

FIG. 6 is a diagram illustrating an example of searching for a tag in a local positioning system according to various embodiments of the present disclosure. For example, when a positioning unit searches for a tag, the positioning unit may operate in a far-field mode.

Referring to FIG. 6, a user may use a gadget so as to transmit a command to search for the tag 140 to the positioning unit. In this instance, the tag 140 may be a registered tag. According to various embodiments, the positioning unit may be a master positioning unit. According to the command of the master positioning unit, all positioning units in the local positioning system may be enabled in the far-field mode, and the power of the positioning units that operate in the far-field mode may maximally increase so as to provide the maximum distance to which the packets of the positioning units can propagate. In the far-field mode, a packet of a positioning unit may reach all of the tags disposed in the coverage of the local positioning system.

All positioning units send identical address search packets modulated with the identifying data of the registered tag being sought. In the search for a registered tag, the address search packet sent by the positioning unit should be modulated only with identifying data of the registered tag being sought.

Having received the address search packet modulated with identifying data of the tag to be located, each of the registered tags disposed in the local positioning system:

retrieves the identifying data from the address search packet;

determines whether the identifying data matches its identifying data;

sends a positioning pulse into the space if it has been determined that the received identifying data matches its identifying data;

the positioning unit receives the positioning pulse from the tag and assigns "detected" status to the tag;

wherein if the tag identifying data does not match the identifying data with which the address search packet is modulated, the tag does not send any pulse in response.

Each positioning unit can send a broadcast search packet modulated with a range of identifying data of a group of tags to be detected and with identifying data of the local positioning system to which the positioning unit belongs.

In this case, the tag registered in this local positioning system will not respond to the broadcast search packet as the tag determines upon its reception that the system identifying data in this packet matches identifying data of the system stored in its memory.

Having received the broadcast search packet, each tag that is not registered in this system retrieves the identifying data range for the group of tags, finds identifying data matching its identifying data, sends a positioning pulse, and if the tag identifying data does not match any of identifying data from the range, with which the broadcast search packet is modulated, the tag does not send a positioning pulse.

Broadcast search packet can also include identifying data of several different systems. Then only tags, whose system identifying data does not match any of that specified in the packet, will respond to the broadcast search packet. This is useful in the case where the local positioning system knows about the existence of neighboring local positioning systems and intends to detect tags that are not registered in any of these systems, but are disposed in their spaces.

The selective positioning, where only unregistered tags respond to the broadcast search packet, reduces power consumption by the positioning unit compared to the prior art, as well as eliminates overlapping the positioning pulses from several tags and decreases the search time because no time is wasted for excessive search of registered tags as they do not respond.

As shown in FIG. 6, when searching for an unregistered tag 140, each of the positioning units can interrogate only a portion of the space defined by the local positioning system. The space can be conditionally divided by each of the positioning units, for example, into four sectors—sector 1, sector 2, sector 3, sector 4, as shown by dashed arrows, or into any number of sectors. Positioning unit sequentially interrogates each sector in order to reduce the number of unregistered tags that can respond to the search packet, until the desired tag 140 is detected. All units of the system may perform the search, for example, alternately.

According to various embodiments, a registered tag may be retrieved only after a user registers the tag. For example, the retrieval of a registered tag may be allowed after registering a tag by inputting each piece of identifying data of a tag to a system one by one, manually inputting the identifying data of a tag in the form of a number of a barcode, or bringing tags, one by one, close to a positioning unit that operates in the near-field mode. However, when a user desires to automatically identify and register an unregistered tag in an area via a single search request, instead of registering tags one by one, or when the user is not aware of the accurate position of an unregistered tag, it is needed to search for a tag and to identify the position thereof. For example, when an object such as a purse or a key including an attached tag is missing without being registered in the area of the local positioning system, it is needed to search for an unregistered tag. In this instance, there is needed a method of searching for an unregistered tag as described below.

According to various embodiments, if there is a need to detect a tag that is not registered in the local positioning system and has unknown identifying data, the following search method is used. All positioning units send in sequence an identical broadcast search packet under control of the master unit, i.e. each slave unit sends the broadcast search packet only on the command of the master unit, and the master unit specifies the ID range to the slave unit and all other parameters for the broadcast search packet. Algorithm of operation of the master positioning unit with the slave positioning unit at such sequential interrogation can be as follows: first, the master positioning unit itself sends a broadcast search packet and then successively instructs each of the slave positioning units to send the same broadcast search packet. Each of the positioning units sends the broadcast search packet in sequence to all sectors within the local positioning system, and the division of the space into sectors is performed by each unit independently of the other units. Moreover, the broadcast search packet is modulated with the range of tag identifying data, which includes all known identifying data of all manufactured tags, and with identifying data of the local positioning system (LPS) in which the search is performed. Tags registered in the LPS will not respond to the broadcast search packet because the broadcast search packet will contain identifying data of the LPS in which these tags are registered.

FIG. 7 is a diagram illustrating signal exchange performed for searching for a desired registered tag in a local positioning system according to various embodiments of the present disclosure. FIG. 7 illustrates signal exchange performed between the positioning unit 110 and the tag 140. The tag 140 is assumed to be a tag registered in the local positioning system.

The positioning unit 110 may receive information including at least one of a command to find the position of the tag 140 or a command to find the identifying data of the desired registered tag 140 in order to search for the registered tag 140. Subsequently, the information may be broadcasted by the positioning unit 110 in the area of the local positioning system. Therefore, all tags existing in the local positioning system area may receive the information. All of the tags may compare the identifying data included in the received command with their own identifying data. A tag that has identifying data identical therewith may transmit a positioning pulse used for calculating the position of the tag, whereby the registered tag may be retrieved and the position thereof may be identified.

Referring to FIG. 7, in operation 701, the positioning unit 110 may transmit an address search packet. For example, the positioning unit 110 may transmit, to the tag 140, an address search packet modulated with the identifying data of a desired registered tag in order to search for the desired registered tag. For example, the positioning unit 110 may transmit an address packet in all directions of the local positioning system. The tag 140 may be assigned with a "registered" status in the local positioning system. For example, the identifying data of the tag 140 may be stored in the system as being in the "registered" status. According to various embodiments, the command to search for the registered tag 140 may be transmitted to at least one positioning unit 110.

In operation 703, the positioning unit 110 may receive a positioning pulse. For example, the positioning unit 110 may receive a positioning pulse transmitted from each of the tags located in the local positioning system in response to the address search packet which is modulated with the identifying data of the desired registered tag and is transmitted from the positioning unit 110. For example, the tag 140 may retrieve the identifying data modulated in the address search packet, and may determine whether the retrieved identifying data is identical to its own identifying data. When the retrieved identifying data is identical to its own identifying data, the tag 140 may transmit a positioning pulse to the space of the local positioning system. At least one positioning unit 110 may receive the positioning pulse from the tag 140, and may assign a "detected" status to the tag 140. For example, the positioning unit 110 may store the identifying data of the tag 140. When the identifying data of the tag 140 is different from the identifying data of the desired registered tag, with which the address search packet is modulated, the tag 140 may not transmit a positioning pulse.

According to various embodiments, the at least one positioning unit 110 may be enabled in the far-field mode, which maximizes the power of the positioning unit 110, in order to maximize the distance to which a search packet of the positioning unit 110 can propagate.

For clarity, FIG. 8 illustrates an example of a change in an ID range used for detecting the ID of a tag that is not registered in a local positioning system.

As shown in FIG. 8, a response to a broadcast search packet modulated with the range of tag identifying data will be issued by a tag that is not registered in the LPS and whose identifying data falls into the specified range. If the positioning unit receives a response in the form of a positioning pulse from at least one tag in the specified identifying data range, the positioning unit bisects the identifying data range into two halves and sends a broadcast search packet first with the identifying data range from one half and then from the other half. If one of these halves receives a response, the positioning unit bisects again the half in which the response is received, and so on, until only one tag ID (identifying data) remains. The detected identifying data will be the identifying data of the desired unregistered tag.

Further, knowing the tag identifying data, the positioning unit can register the tag in the local positioning system and search for its location using all the positioning units disposed in the local positioning system.

It should be emphasized that to reduce the cost of the structure and minimize power consumed by tags, the tags have a very restricted functionality and can send only a single positioning pulse in far-field mode. The pulse carries a minimum of information and serves to locate the tag in the space. As mentioned above, the presence/absence of a tag positioning pulse is used as the answer "yes/no", respectively, i.e. the broadcast search packet with the tag ID range is used to interrogate the range of tags with the question: "Is there at least one tag with data from the range within the system coverage?" If at least one tag sends a positioning pulse in response to this question, the system continues defining the tag ID more precisely. If not, there are no tags in this ID range, and the system stops interrogating this range.

If the positioning unit receives a response in the form of a plurality of positioning pulses from several unregistered tags having identifying data within the specified identifying data range, the positioning unit bisects the identifying data range and sends the broadcast search packet first with the identifying data range from one half and then from the other half. If a response is received from one half and from the other half, the unit bisects the first half and sends the broadcast search packet first with the identifying data range from one half and then from the other half; the unit also bisects the second half and sends the broadcast search packet with the identifying data range first from one half, and then from the other half. If a response is received, the positioning unit again bisects the half in which the response is received, and so on, until the ID range of a group of unregistered tags remains. As a result, the unit will detect IDs of all unregistered tags and register them in the system. Next, the group of units will locate these tags, and the user should select the desired tag from these detected tags upon seeing them all.

To provide combined operation of a plurality of local positioning systems that have overlapping space areas, system units can receive signals from units of neighboring systems in order to determine IDs of the neighboring systems and automatically enter them into own database. The user does not participate in this process. The process of determining neighboring systems is executed by the units periodically.

Further, the local positioning system can indicate ID of the neighboring system in search packets so that its tags were silent in the search process.

The present local positioning system can be supplemented with virtual reality glasses, e.g. when the user looks at a part of the room in virtual reality glasses, the positioning unit performs search exactly in that part of the room, which is within the field of view of the virtual reality glasses. Using the virtual reality glasses, the user sees the part of the room, which is in the field of view of the glasses, and the place where the desired tag is located, and the detected tag can be displayed in any desired form.

FIG. 9 is a diagram illustrating signal exchange performed for searching for an unregistered tag in a local positioning system according to various embodiments of the present disclosure. FIG. 9 illustrates signal exchange performed between the positioning unit 110 and the tag 140.

Referring to FIG. 9, in operation 901, the positioning unit 110 transmits a broadcast search packet modulated with the identifying data range of all tags and system-identifying data. According to various embodiments, the positioning unit 110 may broadcast a broadcast search packet. The tag 140 that receives the broadcast search packet may not be assigned with a "registered" status in the local positioning system. For example, the identifying data of the tag 140 may not be stored in the system as being in the "registered" status.

In operation 903, the positioning unit 110 may receive a positioning pulse. That is, the tag 140 may transmit a positioning pulse to the positioning unit 110 in response to the reception of the broadcast search packet. According to various embodiments, the tag 140 may broadcast a positioning pulse. After receiving the broadcast search packet, the tag 140 may retrieve the identifying data range modulated in the broadcast search packet, and may determine whether the retrieved identifying data range includes identifying data that is identical to the identifying data of the tag 140. When it is determined that the identifying data of the tag 140 is included, the tag 140 may transmit a positioning pulse. Otherwise, the tag 140 may not transmit a positioning pulse.

In operation 905, the positioning unit 110 may transmit broadcast search packets modulated with a predetermined identifying data range and system-identifying data. According to various embodiments, the positioning unit 110 may broadcast the broadcast search packets. When the positioning unit 110 that receives a positioning pulse in operation 903 receives a positioning pulse from the tag 140 which has identifying data falling in the identifying data range modulated in the broadcast search packet transmitted in operation 901, the positioning unit 110 may bisect the identifying data range, may transmit a broadcast search packet modulated with the identifying data corresponding to the first half, and may transmit a broadcast search packet modulated with the identifying data corresponding to the remaining half.

In operation 907, the positioning unit 110 may receive a positioning pulse. That is, the tag 140 may receive broadcast search packets, and may transmit a positioning pulse to the positioning unit 110 in response thereto. According to various embodiments, the tag 140 may broadcast a positioning pulse. The tag 140 may receive the broadcast search packets which are separated by bisecting the identifying data range, may retrieve the identifying data ranges separately modulated in the broadcast search packets, and may determine whether the retrieved identifying data ranges include identifying data that is identical to the identifying data of the tag 140. When it is determined that the identifying data of the tag 140 falls in the identifying data range included in one of the broadcast search packets, the tag 140 may transmit a positioning pulse in response to the corresponding broadcast search packet. Otherwise, the tag 140 may not transmit a positioning pulse.

For example, the positioning unit 110 may receive, as a response, a positioning pulse corresponding to one of the broadcast search packets which are modulated with halves of the identifying data range. The positioning unit 110 may repeatedly perform the process of transmitting a broadcast search packet modulated with identifying data of the half of the range, and receiving a positioning pulse in response thereto. The repeated process may be performed until the identifying data of a single tag remains, and the single piece of identifying data may be identifying data of the tag 140 that is not registered in the local positioning system. For example, the positioning unit 110 may bisect the half range in which a response is received again until the identifying data of the tag 140 remains.

In operation 909, the positioning unit 110 may transmit broadcast search packets modulated with a single piece of identifying data and system-identifying data. According to various embodiments, the positioning unit 110 may broadcast the broadcast search packets. For example, in the process repeated after operation 907, when the positioning unit 110 receives a positioning pulse from the tag 140 having identifying data which falls in an identifying data range modulated in a transmitted broadcast search packet, in response to the corresponding broadcast search packet, the positioning unit 110 may bisect the identifying data range, may transmit a broadcast search packet modulated with a piece of identifying data, and may transmit a broadcast search packet modulated with the remaining identifying data.

In operation 911, the positioning unit 110 may receive a positioning pulse. That is, the tag 140 may receive the broadcast search packets modulated with the single identifying data range and the identifying data of the system, and may transmit a positioning pulse to the positioning unit 110 again in response. According to other embodiments, the tag 140 may broadcast a positioning pulse. The tag 140 may receive broadcast search packets which are respectively modulated with a single piece of identifying data since a predetermined identifying data range is bisected, may retrieve identifying data modulated in the broadcast search packets, and may determine whether the retrieved identifying data is identical to the identifying data of the tag 140. When it is determined that the identifying data included in one of the broadcast search packets is identical to the identifying data of the tag 140, the tag 140 may transmit a positioning pulse in response to the corresponding broadcast search packet. Otherwise, the tag 140 may not transmit a positioning pulse.

Accordingly, a unit may detect the identifying data of the unregistered tag 140, may allocate the tag 140 to the system as having "registered" status, and may perform a search.

For example, a process of searching for the unregistered tag 140 when the identifying data range of all tags is from 1 to 1024 and the identifying data is "400" will be described. The positioning unit 110 may store the range of all tag identifiers in a broadcast search packet modulated with the identifying data range of all tags. For example, the broadcast search packet may store data including number "1" and "1024". When the broadcast search packet is broadcasted and the tag 140 located in a predetermined area receives the broadcast search packet, the tag 140 may determine whether the identifying data of the tag 140 falls in the identifying data range stored in the broadcast search packet. According to various embodiments, the broadcast search packet may store a system identifier, and the tag 140 may receive the broadcast search packet and may determine whether the tag 140 is registered in the system.

When it is determined that the identifying data "400" of the tag 140 falls in the identifying data range and that the tag 140 is not registered, the tag 140 may transmit a positioning pulse in response thereto. When the positioning unit 110 receives the positioning pulse, the positioning unit 110 may identify that at least one unregistered tag exists in the system. The positioning unit 110 that receives the positioning pulse may search for the unregistered tag 140 using a method of bisecting the identifying data range so as to narrow down the scope of the search. For example, the method may bisect the range so as to separately broadcast a broadcast search packet including an identifying data range of (1, 512) and a broadcast search packet including an identifying data range of (513, 1024), and may determine whether the tag 140 having identifying data falling in one of the ranges is to send a response pulse. For example, since the identifying data of the tag 140 is "400", the tag 140 may transmit a positioning pulse in response to the broadcast search packet containing data of (1, 512), which corresponds to the first half, and may not respond to the packet containing data of (513, 1024). The positioning unit 110 may divide the identifying data range of 1 to 512 into the range of 1 to 256 and the range of 257 to 512 in order to further narrow down the scope of the search, and may receive a positioning pulse in response to a packet storing the data of (257, 512). The positioning unit 110 may broadcast a broadcast search packet modulated with the last single piece of identifying data of "400", and may perform search range bisection until a response is received. Finally, the positioning unit 110 may find that the identifying data of the tag 140 is "400".

According to various embodiments, when another unregistered tag exists, the process of searching for an unregistered tag may be performed several times. For example, when the identifying data range of all tags has a 32-bit value and the range is from 1 to 4294967296, one broadcast search packet modulated with the identifying data range of all tags and 32 bisected broadcast search packets may be broadcasted.

FIG. 10 is a flowchart illustrating a method of identifying the position of a tag by a positioning unit according to various embodiments of the present disclosure. FIG. 10 illustrates the operation method of the positioning unit 110.

Referring to FIG. 10, in operation 1001, the positioning unit transmits a packet including the identifying data of a local positioning system in a near-field mode. According to various embodiments, the positioning unit receives, from a tag, a packet modulated with the identifying data of the tag in response to the transmission of the packet including the identifying data of the system in the near-field mode, stores the identifying data of the tag, and assign a "registered" status to the tag. For example, the positioning unit may store the identifying data of the tag as being in the "registered" status. The tag registration can be performed without enabling the positioning unit in the near-field mode. However, only a tag right near the positioning unit may response to a packet including the identifying data of the system, and thus tag registration may be more quickly performed in the near-field mode.

In operation 1003, the positioning unit broadcasts a packet including the identifying data of the tag in a far-field mode. According to various embodiments, the positioning unit 110 may transmit the packet including the identifying data of the tag to the tag. According to various embodiments, the positioning unit may receive a positioning pulse in response to the reception of the packet modulated with the identifying data of the tag from the tag, and may assign a "detected" status to the tag. For example, the positioning unit may store the identifying data of the tag as having the "detected" status.

In operation 1005, the positioning unit receives a signal in response to the broadcasted packet and identifies the position of the tag. For example, when the tag transmits a positioning pulse, the positioning unit in the local positioning system calculates the coordinates of the point at which the transmission is performed, whereby the position of the tag may be identified. For example, when at least three positioning units are used, the position of the tag may be identified via triangulation.

FIG. 11 is a flowchart illustrating the operation of a positioning unit when tag registration in a local positioning system is performed according to various embodiments of the present disclosure. FIG. 11 illustrates the operation method of the positioning unit 110.

Referring to FIG. 11, in operation 1101, the positioning unit is enabled in a near-field mode. For example, the positioning unit may be enabled in the near-field mode, in which the power of the positioning unit decreases, in order to decrease the distance to which the search packets of the positioning unit can propagate. Since only a tag that is right near the positioning unit responds to a packet for registration transmitted by the positioning unit, tag registration may be more quickly performed in the near-field mode. According to various embodiments, a tag may be located at a distance from the positioning unit, wherein the distance does not exceed the distance that the packets of the positioning unit can propagate in the near-field mode.

In operation 1103, the positioning unit may transmit a packet including the identifying data of the local positioning system. According to various embodiments, the positioning unit may broadcast the packet including the identifying data of the system. For example, a tag may receive the packet including the identifying data of the system from the positioning unit, may store the same, and may identify the system.

In operation 1105, the positioning unit may receive a response packet modulated with the identifying data of the tag. The identifying data of the tag is the unique identifier of the tag, and thus the positioning unit may identify the tag based on the received response packet.

In operation 1107, the positioning unit may store the identifying data of the tag, and may assign a "registered" status. For example, the positioning unit may identify the tag via the identifying data of the tag based on the received response packet, and may store the identifying data as having the "registered" status, thereby registering the tag in the system and assigning the "registered" status thereto. According to various embodiments, the positioning unit is capable of recognizing the identifying data of a registered tag, and thus, in a process of searching for a tag and identifying the position thereof, the positioning unit may need to recognize the identifying data of a predetermined tag. According to various embodiments, the positioning unit may transmit the "registered" status to a user smart phone for a tag.

FIG. 12 is a flowchart illustrating the operation of a tag when tag registration in a local positioning system is performed according to various embodiments of the present disclosure. FIG. 12 illustrates the operation method of the tag 140.

Referring to FIG. 12, in operation 1201, the tag receives a packet including the identifying data of the local positioning system. For example, the identifying data of the system is the unique identifier of the system, and thus the tag may identify the system based on the received packet.

In operation 1203, the tag may store the identifying data of the local positioning system. For example, the tag may store the identifying data of the system, and when a positioning unit of a different system transmits a search packet, the tag may identify the system to which the positioning unit that performs a search process belongs.

In operation 1205, the tag transmits a response packet modulated with the identifying data of the tag. According to various embodiments, the tag may broadcast the response packet modulated with the identifying data of the tag to the space of the system. By transmitting the identifying data of the tag to the positioning unit, the positioning unit is capable of identifying, registering, and retrieving the tag.

FIG. 13 is a flowchart illustrating the operation of a positioning unit when a search for a tag registered in a local positioning system is performed according to various embodiments of the present disclosure. FIG. 13 illustrates the operation method of the positioning unit 110.

Referring to FIG. 13, in operation 1301, the positioning unit is enabled in a far-field mode. For example, the positioning unit may be enabled in the far-field mode, which maximizes the power of the positioning unit, in order to maximize the distance to which a search packet of the positioning unit can propagate. Since a tag that is located at a far distance may respond to the search packet transmitted by the positioning unit, the positioning unit may search for a tag in a broad area. According to various embodiments, a tag may be located at a distance from the positioning unit, and the distance may be the distance that the packets of the positioning unit can propagate in the far-field mode.

In operation 1303, the positioning unit may broadcast an address search packet modulated with the identifying data of a desired registered tag in all directions. According to various embodiments, the positioning unit may transmit the address search packet to the desired registered tag. For example, the tag may receive the address search packet including the identifying data of the desired registered tag from the positioning unit, and may determine whether the identifying data modulated in the address search packet is identical to the identifying data of the tag. According to various embodiments, the address search packet may be modulated with the identifying data of the system.

In operation 1305, the positioning unit 110 may determine whether a positioning pulse is received. For example, when each of the registered tags located in the local positioning system receives an address search packet, retrieves identifying data from the address search packet, and determines that the retrieved identifying data is identical to the identifying data of at least one registered tag, the positioning unit may receive a positioning pulse from the at least one registered tag. For example, when the positioning unit receives a positioning pulse from a predetermined tag in response to the address search packet, the predetermined tag may be the desired registered tag. For example, when the retrieved identifying data is different from the identifying data of at least one registered tag, the tags may not transmit a positioning pulse. Accordingly, the positioning unit may not receive a positioning pulse.

When the positioning unit receives a positioning pulse in operation 1305, the positioning unit may assign a "detected" status to the registered tag in operation 1307. For example, when the identifying data modulated in the address search packet is identical to the identifying data of at least one registered tag, the positioning unit may retrieve the registered tag that transmits the positioning pulse since the positioning unit stores the identifying data of the registered tag. For example, the tag that transmits the positioning pulse in response to the address search packet may be the desired registered tag. The positioning unit may assign the "detected" status to the registered tag that transmits the positioning pulse. For example, the positioning unit may store the identifying data of the registered tag that transmits the positioning pulse, as having the "detected" status. When the positioning unit does not receive a positioning pulse in operation 1305, the positioning unit may not assign the "detected" status to the registered tag.

FIG. 14 is a flowchart illustrating operation of a tag when a search for a tag registered in a local positioning system is performed according to various embodiments of the present disclosure. FIG. 14 illustrates the operation method of the tag 140. Here, the tag is assumed to be a tag registered in the local positioning system.

Referring to FIG. 14, in operation 1401, the tag receives an address search packet modulated with the identifying data of a desired registered tag. For example, since the identifying data of the tag is the unique identifier of the tag, the tag may receive the address search packet from the positioning unit in order to determine whether the identifying data of the desired registered tag is identical to its own identifying data.

In operation 1403, the tag may retrieve the identifying data from the address search packet. For example, the tag may receive the address search packet modulated with the identifying data of the desired registered tag, and may retrieve the identifying data modulated in the address search packet. For example, the identifying data of the tag is the unique identifiers of the tags, and thus the tag needs to retrieve the identifying data modulated in the address search packet so as to identify whether the tag corresponds to the desired registered tag.

In operation 1405, the tag may determine whether the retrieved identifying data is identical to its own identifying data. For example, the process of determining whether the identifying data retrieved from the address search packet is identical to its own identifying data may be the process of identifying whether the tag corresponds to the desired registered tag.

When the tag determines that the retrieved identifying data is identical to its own identifying data in operation 1405, the tag may broadcast a positioning pulse in operation 1407. According to various embodiments, the tag may transmit the positioning pulse to the positioning unit. For example, the tag that transmits the positioning pulse in response to the address search packet may be the desired registered tag, and may have a "detected" status assigned thereto by the positioning unit. When the tag determines that the retrieved identifying data is different from its own identifying data, the tag may not broadcast a positioning pulse.

FIG. 15 is a flowchart illustrating the operation of a positioning unit when a search for a tag that is not registered in a local positioning system is performed according to various embodiments of the present disclosure. FIG. 15 illustrates the operation method of the positioning unit 110. The unregistered tag may be a tag that is not registered in the local positioning system. In order to register an unregistered tag of which the position is not known, and to identify the position thereof, the positioning unit may broadcast a broadcast packet to a predetermined area and may receive a response.

Referring to FIG. 15, in operation 1501, the positioning unit broadcasts a broadcast search packet modulated with the identifying data range of all tags and system-identifying data. For example, the positioning unit may broadcast, to the space of the system, the broadcast search packet modulated with the identifying data of all tags which may be registered in the local positioning system. According to various embodiments, the broadcast search packet may be further modulated with the identifying data of one or more other local positioning systems.

In operation 1503, the positioning unit may determine whether a positioning pulse is received. For example, when an unregistered tag, the position of which is not identified, is located in an area where the broadcast search packet is broadcasted, the positioning unit receives the packet from the unregistered tag, the unregistered tag may transmit a positioning pulse in response thereto. As a result, the positioning unit may receive the positioning pulse. For example, when an unregistered tag is not located in the area where the packet is broadcasted, the positioning unit may not receive a positioning pulse.

When the positioning unit receives a positioning pulse in operation 1503, the positioning unit may bisect a predetermined identifying data range in operation 1505. That is, the positioning unit may bisect the predetermined identifying data range modulated in the broadcast search packet. For example, when the positioning unit broadcasts the broadcast search packet modulated with the identifying data range of all tags and receives a positioning pulse in response thereto, the positioning unit may bisect the identifying data range of all tags. For example, the positioning unit bisects the identifying data range and broadcasts broadcast search packets modulated with the bisected identifying data ranges until a single piece of identifying data of an unregistered tag remains, and thus may retrieve an unregistered tag that responds to a broadcast search packet modulated with the last single piece of identifying data. According to various embodiments, when the positioning unit does not receive a positioning pulse, a tag having identifying data that falls in the predetermined identifying data range does not exist in the predetermined area. Accordingly, the positioning unit may not bisect the predetermined identifying data range.

In operation 1507, the positioning unit may broadcast a broadcast search packet modulated with the identifying data range corresponding to the first half and a broadcast search packet modulated with the identifying data range corresponding to the remaining half According to various embodiments, the positioning unit transmits the broadcast search packets having respective halves of the identifying data range, and identifies a tag that responds to a corresponding packet using a positioning pulse, thereby identifying the range that the identifying data of the unregistered tag falls in from among the bisected identifying data ranges. For example, in the case in which the positioning unit transmits broadcast search packets modulated by bisecting the identifying data range of all tags, when an unregistered tag transmits a positioning pulse in response to the broadcast search packet modulated with a first identifying data range, it is identified that the identifying data of the unregistered tag falls in the identifying data range of the first range.

In operation 1509, the positioning unit determines whether a positioning pulse modulated with the identifying data of a single tag is received. That is, the positioning unit may determine whether a positioning pulse of a tag corresponding to the broadcast search packet modulated with the identifying data of a single tag is received. For example, when the positioning unit bisects the predetermined identifying data range and transmits two broadcast search packets respectively modulated with a single piece of identifying data, an unregistered tag may transmit a positioning pulse in response to a single broadcast search packet modulated with a single piece of identifying data. Accordingly, the positioning unit may identify, register, and retrieve the identifying data of the unregistered tag so as to identify the position of the tag. When the positioning unit determines that a positioning pulse modulated with the identifying data of a single tag is not received in operation 1509, the positioning unit may repeatedly perform operations 1505 to 1509. For example, the positioning unit may repeatedly perform the operation of transmitting broadcast search packets modulated with the halves of the predetermined identifying data range and receiving a positioning pulse in response thereto. The repeated process may be performed until the identifying data of a single tag remains, and the single piece of identifying data may be the identifying data of a tag that is not registered in the local positioning system. For example, the positioning unit may repeatedly halve the identifying data range in which a response is received until the identifying data of a tag remains.

FIG. 16 is a flowchart illustrating the operation of a tag when a search for a tag not registered in a local positioning system is performed according to various embodiments of the present disclosure. FIG. 16 illustrates the operation method of the tag 140. Here, the tag is assumed to be a tag that is not registered in the local positioning system.

Referring to FIG. 16, in operation 1601, the tag receives a broadcast search packet modulated with a predetermined identifying data range and system-identifying data. For example, when the positioning unit starts searching for an unregistered tag, the tag may receive a broadcast search packet modulated with the identifying data range of all tags. For example, the positioning unit may transmit a broadcast search packet modulated with a single piece of identifying data, and a tag may transmit a positioning pulse in response to the same, whereby the process in which the positioning unit searches for an unregistered tag may be completed.

In operation 1603, the tag retrieves the identifying data range from the broadcast search packet. For example, the tag determines whether its own identifying data falls in the identifying data range modulated in the broadcast search packet, and identifies whether the unregistered tag desired by the positioning unit is identical to its own identifying data.

In operation 1605, the tag determines whether the identifying data of the tag falls in the retrieved identifying data range. Here, the retrieved identifying data range may be the identifying data range modulated in one of the broadcast search packets that the positioning unit broadcasts.

When it is determined that the identifying data of the tag falls in the retrieved identifying data range in operation 1605, the tag may broadcast a positioning pulse in operation 1607. That is, the tag may broadcast the positioning pulse to the space of the local positioning system. According to various embodiments, the tag may broadcast the positioning pulse to the positioning unit. For example, when the tag receives a broadcast search packet modulated with the identifying data range corresponding to the first half of the identifying data range of all tags or a broadcast search packet modulated with the identifying data range corresponding to the remaining half, the identifying data of an unregistered tag may fall in one of the identifying data ranges corresponding to the first half of the identifying data range of all tags and the identifying data range corresponding to the remaining half. Accordingly, the tag may broadcast a positioning pulse in response to one of the broadcast search packet modulated with the identifying data range corresponding to the first half and the broadcast search packet modulated with the identifying data range corresponding to the remaining half, which are broadcasted by the positioning unit. For example, when the tag receives broadcast search packets respectively modulated with a single piece of identifying data, the tag transmits a positioning pulse in response thereto and the identifying data modulated in a corresponding broadcast search packet may be identical to the identifying data of the tag. According to various embodiments, when the identifying data of the tag does not fall in the identifying data range modulated in a broadcast search packet, the tag may not broadcast a positioning pulse in response to the broadcast search packet.

The present invention makes is possible to register new tags in a local positioning system, as well as to determine identifying data and detect unregistered tags in the system without interfering with the process of searching the tags already registered in the system. It should be noted that the present invention is not concerned with exact locating of tags.

A user attaches to desired objects small flexible tags that can operate without batteries, each tag comprising its identification information.

To operate the local positioning system, the user must register, on own personal device (e.g. smartphone), identifying data of the tag and the object/subject, to which the tag is attached, i.e. using a required number of tags the user attaches them to selected objects and registers, in the personal device, identifying data of each tag and the object to which this tag is attached, so that upon receiving the tag location information from the positioning unit, the user could determine the detected object based on the identifying data. Information about the tag and its respective object can be registered in any user-friendly form, e.g. a table of correspondence of objects and tag identification information.

The present invention enables searching identifying data of a tag in a local positioning system, in which the tag is not registered. If a person lost an item (e.g. wallet) with a built-in tag inside building, and identifying data of the tag is unknown, the invention can determine identifying data of the lost tag for further exact locating thereof.

The following are the main terms used to describe the present invention.

Local positioning system comprises positioning units configured to detect tags and their identifying data. Local positioning system comprises a combination of positioning units disposed in fixed locations and tags disposed arbitrarily in the coverage of the positioning units, the system being defined by a space (system space), in which search packets sent by the positioning unit can propagate.

Positioning units comprise transceivers having fixed locations selected by the user and configured to transmit address search packets and broadcast search packets modulated with identifying data and to receive positioning pulses from at least one tag, to process the positioning pulses and transmit to the user device in the form of information about location of the tag sought by the user. Positioning unit includes a search packet transmitter, a microcontroller, a positioning receiver, an interface for communication with the user device, and an antenna. One positioning unit is sufficient to determine identifying data of a tag and to register it in the local positioning system.

Broadcast search packet is sent by a positioning unit to the system space; broadcast search packet comprises identifying data of the system and a range of identifying data of interrogated tags, the broadcast search packet being used to determine identifying data of tags not registered in the system, but disposed within the coverage of the positioning unit. Optionally, broadcast search packet may contain any necessary data.

Address search packet is sent by a positioning unit when searching for a tag registered in the local positioning system and contains identifying data of the specific tag to be located.

Packet intended to add a tag to a local positioning system and containing identifying data of the local positioning system is sent by a positioning unit to the tag being registered to store the identifying data of the local positioning system in memory of the tag being registered. Upon receipt of this packet, the tag being registered stores the identifying data of the local positioning system in internal memory of its microcontroller.

Packet intended to remove a tag from a local positioning system is sent by a positioning unit to notify the tag of its removal from the local positioning system in which the tag was registered.

Tag is a small flexible device that can be attached to any object. Along with battery-containing tags the present invention can use batteryless tags. Upon receiving a search packet such tags can store energy of the received search packet as charging energy. Tag can receive search packets (both address and broadcast) that contain identifying data, retrieve identifying data from the search packet, determine whether the identifying data matches its identifying data, send into the space a positioning pulse if it is determined that the received identifying data matches its identifying data. While working in close proximity to a positioning unit (in near field) where constant powering from the positioning unit is provided, the tag can generate a packet containing its identifying data and send this packet to the positioning unit in the proximity of which the tag is located.

Positioning pulse is sent by a tag. Tag sends the same type of pulse responsive to both address search packet and broadcast search packet. With the broadcast search packet, the presence/absence of a positioning pulse from the tag is the answer "yes/no", respectively, to the question "Is there a tag with identifying number from the specified range in the coverage of positioning unit(s)?" Using address search packet, positioning units can also calculate coordinates of the point from which the positioning pulse was sent; in this case at least three positioning units are used.

Identifying data (ID) comprises an individual tag number that is assigned to each tag in the manufacture, thereby eliminating the existence of tags with the same ID. Each system has its ID as well. Any desired system IDs can be generated when a local positioning system is installed by the user or manufactured. Moreover, coincidence of IDs of local positioning systems is allowed, but the probability of coincidence should be low. Random identifiers of sufficient length can be generated when the system is installed, in this case the probability of coincidence will be very low in practice. System IDs are stored in the positioning unit. Further, all devices registered in the local positioning system retain the identification number of the local positioning system.

Local positioning system comprises a master unit and slave units. Master unit of the system differs from slave units in that it controls the operation of the entire system, and also implements the communication interface with the user—receives all commands from the user and sends respective results to the user. Master unit is linked with each of the slave units via wired or wireless communication. Master unit issues control commands to the slave units linked with it. Master unit locates a desired tag using slave units.

When a tag is registered in a local positioning system, master unit stores identifying data of the tag being registered, and the tag stores in its memory identifying data of the system in which the tag is registered. A tag registered in the local positioning system can receive an address search packet modulated with the tag identifying data from a positioning unit. Furthermore, the registered tag can respond to address and broadcast search packets from other local positioning systems.

In this case, the tag registered in the local positioning system and having, along with own identifying data, the identifying data of this system does not respond to broadcast search packet of the positioning unit, modulated with the identifying data of the system in which the tag is registered. Thus, registering in the local positioning system is designed to restrict the number of responses to broadcast search packets and simplify the search for tags that are not registered in this system.

When a broadcast search packet is received, the tag compares the system ID stored upon registering and ID of the interrogating system. If they match, the tag does not respond as being already registered in this system and only waits for address search packet so that not to complicate the search for new tags. If the tag is not registered in the system or ID of the interrogating system does not match ID of the system in which the tag is registered, the tag responds and participates in the general search.

For ease of use, positioning unit can be linked with the user device, e.g. smartphone, via a wireless network, e.g. Bluetooth, and the user can control the positioning unit using this device.

There is provided a method for registering a tag in a local positioning system, said method comprising the following steps. A positioning unit is enabled in near-field mode, in which power of the positioning unit is reduced to reduce distances at which search packets of the positioning unit can propagate. A registered tag is placed at a distance from the positioning unit not exceeding the distance at which packets of the positioning unit can propagate in near-field mode. The positioning unit sends an "add tag to the system" packet comprising identifying data of the local positioning system. The tag stores the identifying data of the local positioning system. The tag sends a response packet modulated with its identifying data to the positioning unit. The positioning unit stores the identifying data of the tag and assigns "registered" status to the tag. The method can further comprise the step of sending, by the positioning unit, the "registered" status to the user smartphone for said tag.

Furthermore, there is provided a method of searching a tag registered in a local positioning system, said method comprising the following steps. Command to search a registered tag is sent to at least one positioning unit. The at least one positioning unit is enabled in far-field mode, in which power of the positioning unit is increased to the maximum possible to maximize the distance at which search packets of the positioning unit can propagate. The at least one positioning unit sends address search packets modulated with identifying data of the desired registered tag to all directions of the local positioning system. Each of the registered tags located in the local positioning system receives the address search packet modulated with identifying data of the desired registered tag; retrieves the identifying data from the address search packet; determines whether the retrieved identifying data matches its identifying data; sends into the space a positioning pulse if the retrieved identifying data matches its identifying data. At least one positioning unit receives the positioning pulse from the tag and assigns "detected" status to the tag. If identifying data of the registered tag does not match the identifying data of the desired registered tag, with which the address search packet is modulated, the registered tag does not send a positioning pulse. Moreover, one of the at least one positioning unit is a master positioning unit. If there is more than one positioning unit, the other positioning units are slave positioning units, said slave positioning units receiving from the master unit commands to send address search packets into the local positioning system.

Furthermore, there is provided a method for searching identifying data of at least one desired tag not registered in the local positioning system, said method comprising:

receiving, by at least one positioning unit from the user, a command to search at least one desired tag having identifying data unknown to the local positioning system and not registered in the local positioning system;

sending, by at least one positioning unit, at least one broadcast search packet modulated with an identifying data range comprising identifying data of all existing tags and with identifying data of the system;

at least one unregistered tag located in the system:
receiving the broadcast search packet;
retrieving the identifying data range from the broadcast search packet;
determining whether the identifying data with which the broadcast search packet is modulated matches its identifying data;
sending a positioning pulse into the space of the local positioning system if it has been determined that the received identifying data matches its identifying data;
wherein if identifying data of at least one unregistered tag does not match the identifying data with which the broadcast search packet is modulated, the unregistered tag does not send a positioning pulse responsive to the broadcast search packet;

(d) if at least one positioning unit receives a response in the form of at least one positioning pulse within the specified identifying data range, the positioning unit bisects the identifying data range in two halves and sends a broadcast search packet modulated with the identifying data range first from one half and then from the other half;

(e) if one of said halves receives a response in the form of at least one positioning pulse, the positioning unit repeats step (d) for this half of the range, wherein (f) steps (d) and (e) are carried out until only identifying data of at least one tag remains, and this identifying data is the identifying data of the at least one desired tag not registered in the local positioning system.

Moreover, each of the tags registered in the system receives at least one broadcast search packet and, having retrieved from the broadcast search packet system the identifying data matching the system identifying data stored in memory of the registered tag, does not respond to the broadcast search packet. One of the at least one positioning unit is a master positioning unit, and if there is more than one positioning unit, the other positioning units are slave positioning units, said slave positioning units receiving from the master unit commands to send broadcast search packets into the local positioning system. The method further comprises dividing, by at least one positioning unit, the space of the local positioning system into sectors, and performing steps (b-f) in each of the sectors; wherein if at least one positioning unit does not receive a positioning pulse in one of the sectors, said at least one positioning unit is switched to search in the next sector. The at least one broadcast search packet is further modulated with identifying data of one or more other local positioning systems.

Although the invention has been described in connection with certain exemplary embodiments, it is anticipated that the essence of the invention is not restricted by these specific embodiments. On the contrary, it is intended that the essence of the invention includes all alternatives, corrections and equivalents that may be included within the spirit and scope of the claims.

Moreover, the invention retains all equivalents of the claimed invention even if the claims are amended in the process of examination.

What is claimed is:

1. A method performed by an electronic device, the method comprising:
receiving a first input for registering an external tag device;
based on the first input for registering the external tag device, receiving, through a first communication type and originating from the external tag device, a first signal comprising first identification information of the external tag device;
based on the received first identification information of the external tag device, registering the external tag device in the electronic device;
after registering the external tag device in the electronic device, receiving a second input for locating the registered external tag device;

based on the second input for locating the registered external tag device, receiving, through a second communication type different from the first communication type and originating from the external tag device, a second signal comprising second identification information corresponding to the first identification information; and based on the received second signal originating from the external tag device, obtaining location information of the external tag device, wherein the first communication type comprises a Bluetooth communication type, wherein the second signal comprises a positioning pulse received through the second communication type, and wherein the location information of the external tag device is calculated using at least one of time difference of arrival or angle of arrival of the positioning pulse from the external tag device to the electronic device.

2. The method of claim 1, further comprising:
transmitting, through the first communication type, a third signal; and
in response to the transmitting of the third signal, receiving, from the external tag device, the first signal comprising the first identification information of the external tag device.

3. The method of claim 1, further comprising:
after registering the external tag device in the electronic device, receiving, through the first communication type and originating from the external tag device, a third signal; and
based on the third signal received from the external tag device, identifying positioning data of the external tag device.

4. The method of claim 3, further comprising:
receiving, by the electronic device from a user, a command for finding a location of the external tag device; and
based on the receiving of the command, receiving the third signal and identifying the positioning data of the external tag device.

5. The method of claim 1, wherein the positioning pulse of the second signal comprises a frequency in a frequency band equal to or greater than 2.5 gigahertz (GHz).

6. The method of claim 1, further comprising:
displaying a visual indication of a location of the external tag device.

7. The method of claim 1, further comprising:
after registering the external tag device in the electronic device, receiving information regarding detection of the external tag device by another electronic device; and
based on the information regarding detection of the external tag device, identifying positioning data of the external tag device.

8. The method of claim 1, wherein the first communication type and the second communication type comprise different radio access technologies.

9. An electronic device comprising:
a memory;
a transceiver; and
at least one processor coupled with the memory and the transceiver,
wherein the at least one processor is configured to perform:
receiving a first input for registering an external tag device, based on the first input for registering the external tag device, receiving, through a first communication type and originating from the external tag device, a first signal comprising first identification information of the external tag device, based on the received first identification information of the external tag device, registering the external tag device in the electronic device, after registering the external tag device in the electronic device, receiving a second input for locating the registered external tag device, based on the second input for locating the registered external tag device, receiving, through a second communication type different from the first communication type and originating from the external tag device, a second signal comprising second identification information corresponding to the first identification information, and based on the received second signal originating from the external tag device, obtaining location information of the external tag device, wherein the first communication type comprises a Bluetooth communication type, wherein the second signal comprises a positioning pulse received through the second communication type, and wherein the location information of the external tag device is calculated using at least one of time difference of arrival or angle of arrival of the positioning pulse from the external tag device to the electronic device.

10. The electronic device of claim 9, wherein the at least one processor is further configured to perform:
transmitting, through the first communication type, a third signal, and
in response to the transmitting of the third signal, receiving, from the external tag device, the first signal comprising the first identification information of the external tag device.

11. The electronic device of claim 9, wherein the at least one processor is further configured to perform:
after registering the external tag device in the electronic device, receiving, through the first communication type and originating from the external tag device, a third signal, and
based on the third signal received from the external tag device, identifying positioning data of the external tag device.

12. The electronic device of claim 11, wherein the at least one processor is further configured to perform:
receiving, by the electronic device from a user, a command for finding a location of the external tag device, and
based on the receiving of the command, receiving the third signal and identifying the positioning data of the external tag device.

13. The electronic device of claim 9, wherein the positioning pulse of the second signal comprises a frequency in a frequency band equal to or greater than 2.5 gigahertz (GHz).

14. The electronic device of claim 9, further comprising:
a display,
wherein the at least one processor is further configured to:
control to display, on the display, a visual indication of a location of the external tag device.

15. The electronic device of claim 9, wherein the at least one processor is further configured to perform:

after registering the external tag device in the electronic device, receiving information regarding detection of the external tag device by another electronic device, and based on the information regarding detection of the external tag device, identifying positioning data of the external tag device.

16. A tag device comprising:

a memory;

a transceiver; and at least one processor coupled with the memory and the transceiver, wherein the at least one processor is configured to perform:

transmitting, through a first communication type to an external electronic device, a first signal comprising first identification information of the tag device, and after transmitting the first signal, transmitting, to the external electronic device through a second communication type different from the first communication type, a second signal comprising second identification information corresponding to the first identification information, wherein the second signal is transmitted for determining location information of the tag device, wherein the first communication type comprises a Bluetooth communication type, wherein the second signal comprises a positioning pulse transmitted through the second communication type, and wherein the location information of the tag device is calculated using at least one of time difference of arrival or angle of arrival of the positioning pulse from the tag device to the external electronic device.

17. The tag device of claim 16, wherein the positioning pulse of the second signal comprises a frequency in a frequency band equal to or greater than 2.5 gigahertz (GHz).

* * * * *